United States Patent
Otsuka et al.

(10) Patent No.: US 9,466,839 B2
(45) Date of Patent: *Oct. 11, 2016

(54) ELECTRODE ACTIVE MATERIAL FOR ELECTRICITY STORAGE DEVICE, AND ELECTRICITY STORAGE DEVICE USING SAME

(75) Inventors: Yu Otsuka, Osaka (JP); Nobuhiko Hojo, Osaka (JP); Takafumi Tsukagoshi, Osaka (JP); Toshiki Nokami, Kyoto (JP); Jun-ichi Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 964 days.

This patent is subject to a terminal disclaimer.

(21) Appl. No.: 13/583,880

(22) PCT Filed: Mar. 11, 2011

(86) PCT No.: PCT/JP2011/001448
§ 371 (c)(1),
(2), (4) Date: Sep. 10, 2012

(87) PCT Pub. No.: WO2011/111401
PCT Pub. Date: Sep. 15, 2011

(65) Prior Publication Data
US 2013/0004836 A1    Jan. 3, 2013

(30) Foreign Application Priority Data
Mar. 12, 2010    (JP) ................................ 2010-056722

(51) Int. Cl.
     *H01M 4/60*      (2006.01)
     *H01M 4/137*      (2010.01)
(Continued)

(52) U.S. Cl.
     CPC ............... *H01M 4/60* (2013.01); *H01G 11/30* (2013.01); *H01G 11/48* (2013.01); *H01G 11/50* (2013.01);
(Continued)

(58) Field of Classification Search
     CPC .................................................. H01M 10/0525
     See application file for complete search history.

(56) References Cited

U.S. PATENT DOCUMENTS 4,343,871 A    8/1982    Tobishima et al.
5,143,805 A *    9/1992    Anderman ............... H01M 2/14
                                                       429/217

(Continued)

FOREIGN PATENT DOCUMENTS

EP      0 911 893 A1    4/1999
EP      1406339 A1    4/2004

(Continued)

OTHER PUBLICATIONS

JP 2008222559 A Translation from Espacenet.*

(Continued)

*Primary Examiner* — Barbara Gilliam
*Assistant Examiner* — Nathanael Zemui
(74) *Attorney, Agent, or Firm* — McDermott Will & Emery LLP

(57) ABSTRACT

The present invention provides an electrode active material for an electricity storage device, having a structure represented by following formula (1). In the formula (1), $R_1$ to $R_6$ each denote independently a hydrogen atom (except for a case where all of $R_1$ to $R_6$ denote hydrogen atoms), a halogen atom, an optionally substituted phenyl group, an optionally substituted heterocyclic group, or an optionally substituted hydrocarbon group having 1 to 4 carbon atoms.

21 Claims, 1 Drawing Sheet

(51) Int. Cl.
*H01M 10/052* (2010.01)
*H01G 11/30* (2013.01)
*H01G 11/48* (2013.01)
*H01G 11/52* (2013.01)
*H01M 10/0566* (2010.01)
*H01G 11/50* (2013.01)

(52) U.S. Cl.
CPC ............ *H01M 4/137* (2013.01); *H01M 4/606* (2013.01); *H01M 10/052* (2013.01); *H01M 10/0566* (2013.01); *Y02E 60/122* (2013.01); *Y02E 60/13* (2013.01)

(56) References Cited

U.S. PATENT DOCUMENTS

| | | | |
|---|---|---|---|
| 6,413,675 B1 | 7/2002 | Harada et al. | |
| 9,099,746 B2 * | 8/2015 | Otsuka | H01M 10/052 |
| 2003/0118877 A1 | 6/2003 | Armand et al. | |
| 2009/0246631 A1 * | 10/2009 | Hojo | H01M 4/1395 |
| | | | 429/213 |
| 2010/0047688 A1 | 2/2010 | Ohtsuka et al. | |
| 2011/0152491 A1 * | 6/2011 | Kawano et al. | 528/8 |
| 2013/0122367 A1 * | 5/2013 | Otsuka | H01M 4/5835 |
| | | | 429/213 |

FOREIGN PATENT DOCUMENTS

| | | | |
|---|---|---|---|
| EP | 2 234 191 A1 | | 9/2010 |
| JP | 55-161376 A | | 12/1980 |
| JP | 56-086466 A | | 7/1981 |
| JP | 4 087258 A | | 3/1992 |
| JP | 11-126610 A | | 5/1999 |
| JP | 3039484 B2 | | 5/2000 |
| JP | 3045750-82 | | 5/2000 |
| JP | 3257516 B2 | | 2/2002 |
| JP | 2007-305430 A | | 11/2007 |
| JP | 2007305430 A | * | 11/2007 |
| JP | 2008-112630 A | | 5/2008 |
| JP | 2008-222559 A | | 9/2008 |
| JP | 2008222559 A | * | 9/2008 |
| JP | 2009-163918 A | | 7/2009 |
| WO | 2009/118989 A1 | | 10/2009 |
| WO | 2010006852 A1 | | 1/2010 |

OTHER PUBLICATIONS

International Search Report issued in International Application No. PCT/JP2011/001448 issued on Jun. 14, 2011.
Chinese Search Report issued in Application No. 2011800131500 dated Apr. 23, 2014.
Extended European Search Report issued in corresponding European Patent Application No. 11753064.2, mailed on Jul. 14, 2015; 4 pages.

* cited by examiner

ELECTRODE ACTIVE MATERIAL FOR ELECTRICITY STORAGE DEVICE, AND ELECTRICITY STORAGE DEVICE USING SAME

RELATED APPLICATIONS

This application is the U.S. National Phase under 35 U.S.C. §371 of International Application No. PCT/JP/2011/001448, filed on Mar. 11, 2011, which in turn claims the benefit of Japanese Application No. 2010-056722, filed on Mar. 12, 2010, the disclosures of which Applications are incorporated by reference herein.

TECHNICAL FIELD

The present invention relates to an electrode active material for an electricity storage device, and an electricity storage device in which the electrode active material is used.

BACKGROUND ART

With advancement of electronic techniques, portable electronic apparatuses, such as cellular phones, portable personal computers, personal data assistances (PDAs) and portable game machines, have been spread rapidly. Accordingly, electricity storage devices, such as secondary batteries, are in an increasing demand as power supplies for the portable electronic apparatuses. In order to increase the energy densities of the electricity storage devices, research and development for a new electrode active material is being carried out actively.

For example, as a candidate for the new electrode active material, an organic compound capable of causing reversibly an oxidation-reduction reaction is proposed. The organic compound has a specific gravity of about, for example, 1 g/cm$^3$, which is smaller than that of an inorganic oxide, such as lithium cobalt oxide, that has been conventionally used as an electrode active material. Thus, use of the organic compound as an electrode active material may make it possible to develop an electricity storage device having a high energy density. Moreover, it can mitigate risks, such as exhaustion of rare metal resources, resultant soaring prices of the resources, and environmental pollution due to leakage of heavy metal, because the organic compound contains no heavy metal.

As an example of the organic compound that can be used as an electrode active material, a quinone organic compound is known (Patent Literatures 1 to 3, for example). Generally, the quinone organic compound refers to an aromatic compound in which two ketone groups (C=O) are introduced in one aromatic ring.

Patent Literature 1 describes an aqueous secondary battery in which a paraquinone compound and an orthoquinone compound are used as electrode active materials. The paraquinone compound is an organic compound in which two ketone groups are introduced in the para position on an aromatic ring. The orthoquinone compound is an organic compound in which two ketone groups are introduced in the ortho position on an aromatic ring. Patent Literature 1 also describes polymers of quinone organic compounds.

On the other hand, Patent Literatures 4 and 5 each describe a non-aqueous lithium secondary battery in which a quinone organic compound is used as an electrode active material. Patent Literature 5 describes a quinone organic compound (pyrene-4,5,9,10-tetraone) in which four ketone groups are introduced in a pyrene ring.

In this description, a compound having four ketone groups in one molecule is referred to as a "tetraketone compound". Particularly, a compound having a pyrene ring and four ketone groups introduced in the pyrene ring is referred to as an "aromatic tetraketone compound".

CITATION LIST

Patent Literature

PTL 1: JP 3045750 B
PTL 2: JP 3039484 B
PTL 3: JP 3257516 B
PTL 4: JP 56 (1981)-86466 A
PTL 5: JP 2007-305430 A

SUMMARY OF INVENTION

Technical Problem

Generally, an electricity storage device in which a known quinone organic compound is used has a much lower discharge voltage than the discharge voltage (3 to 4 V) of a conventional electricity storage device in which an inorganic oxide, such as lithium cobalt oxide, is used. Thus, it is difficult to increase the substantial energy density of the electricity storage device while using the quinone organic compounds described in Patent Literatures 1 to 3 as electrode active materials.

On the other hand, as a result of intensive studies, the present inventors have found that the quinone organic compound described in Patent Literature 5 exhibits a high energy density and high discharge potential and is promising for increasing the discharge voltage of an electricity storage device. However, the compound described in Patent Literature 5 is easily dissolved in an electrolyte of the electricity storage device in some cases, and does not always have sufficient properties in the viewpoint of achieving desired charging and discharging cycle characteristics.

The present invention is intended to provide a new electrode active material that can, while having a high energy density and high discharge potential, contribute also to the improvement of the charging and discharging cycle characteristics of an electricity storage device. The present invention is also intended to provide an electricity storage device in which the electrode active material is used.

Solution to Problem

That is, the present invention provides an electrode active material for an electricity storage device, having a structure represented by the following formula (1),

[Chemical Formula 1]

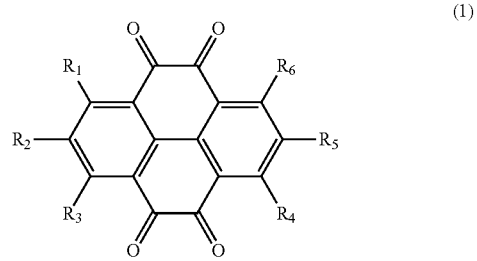

(1)

In the formula (1), $R_1$ to $R_6$ each denote independently a hydrogen atom (except for a case where all of $R_1$ to $R_6$ denote hydrogen atoms), a halogen atom, an optionally substituted phenyl group, an optionally substituted heterocyclic group, or an optionally substituted hydrocarbon group having 1 to 4 carbon atoms.

In another aspect, the present invention provides an electrode active material for an electricity storage device, having a repeating unit represented by the following formula (6).

[Chemical Formula 2]

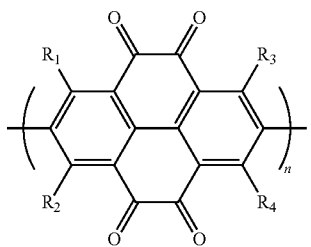

(6)

In the formula (6), $R_1$ to $R_4$ each denote independently a hydrogen atom, a halogen atom, an optionally substituted hydrocarbon group, or an optionally substituted heterocyclic group. n denotes an integer of 2 or more.

In still another aspect, the present invention provides an electrode active material for an electricity storage device, having a repeating unit represented by the following formula (10).

[Chemical Formula 3]

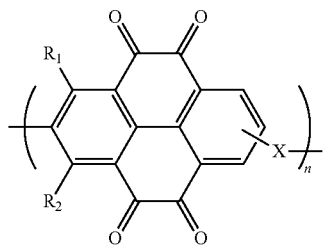

(10)

In the formula (10), $R_1$ and $R_2$ each denote independently a hydrogen atom, a halogen atom, an optionally substituted hydrocarbon group, or an optionally substituted heterocyclic group. X denotes a linker. n denotes an integer of 2 or more.

In still another aspect, the present invention provides an electrode active material for an electricity storage device, having repeating units represented by the following formula (19).

[Chemical Formula 4]

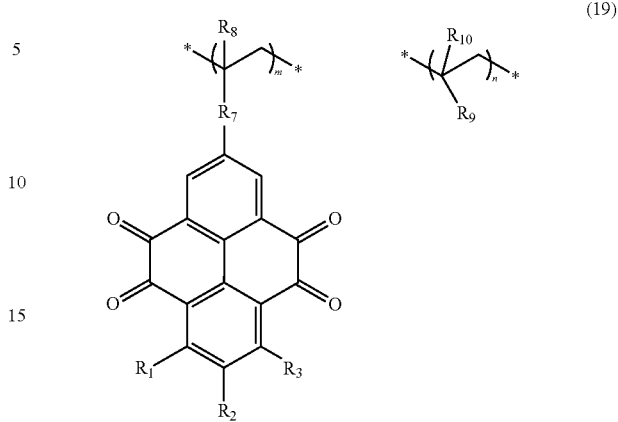

(19)

In the formula (19), $R_1$, $R_2$ and $R_3$ each denote independently a hydrogen atom, a halogen atom, an optionally substituted hydrocarbon group, or an optionally substituted heterocyclic group. $R_7$ denotes an alkylene chain having 1 to 4 carbon atoms, an alkenylene chain having 1 to 4 carbon atoms, an arylene chain, an ester bond, an amide bond, or an ether bond, and is optionally substituted. $R_9$ contains at least one selected from the group consisting of an ester group, an ether group, a carbonyl group, a cyano group, a nitro group, a nitroxyl group, an alkyl group, a phenyl group, an alkylthio group, a sulfone group, and a sulfoxide group. $R_8$ and $R_{10}$ each denote independently a saturated aliphatic group having 1 to 4 carbon atoms, a phenyl group, or a hydrogen atom. n and m each denote an integer of 2 or more.

In still another aspect, the present invention provides an electricity storage device including a positive electrode, a negative electrode, and an electrolyte. At least one selected from the positive electrode and the negative electrode contains, as an electrode active material, the electrode active material for an electricity storage device of the present invention.

Advantageous Effects of Invention

Since the electrode active material for an electricity storage device of the present invention has a pyrene ring and two pairs of ketone groups introduced in the ortho position on the pyrene ring, it can exhibit a high energy density and high discharge potential. Furthermore, the pyrene ring forming a basic skeleton has at least one of a halogen atom, an optionally substituted phenyl group, an optionally substituted heterocyclic group, and an optionally substituted hydrocarbon group having 1 to 4 carbon atoms, as the substituent for a hydrogen atom. The introduction of a substituent can lower the solubility of the electrode active material in the electrolyte of the electricity storage device. Therefore, the electrode active material for an electricity storage device of the present invention can improve the charging and discharging cycle characteristics of the electricity storage device.

In another aspect, since the electrode active material for an electricity storage device of the present invention is a polymer having, in a main chain or a side chain thereof, a basic skeleton of an aromatic tetraketone compound, it is dissolved poorly in the electrolyte of the electricity storage device. Thus, it is possible to improve the charging and discharging cycle characteristics of the electricity storage device. Moreover, since the electrode active material for an electricity storage device of the present invention maintains properties that a monomer has, it can exhibit a high energy density and high discharge potential.

Furthermore, since the electrode active material for an electricity storage device of the present invention contains no heavy metal, it can mitigate risks, such as exhaustion of rare metal resources, resultant soaring prices of the resources, and environmental pollution due to leakage of heavy metal. In addition, the electrode active material for an electricity storage device of the present invention can have a smaller specific gravity than that of an inorganic oxide that has been used conventionally as an electrode active material. Thus, the electrode active material for an electricity storage device of the present invention makes it easy to reduce the weight of the electricity storage device.

DESCRIPTION OF EMBODIMENTS

Figure 1:
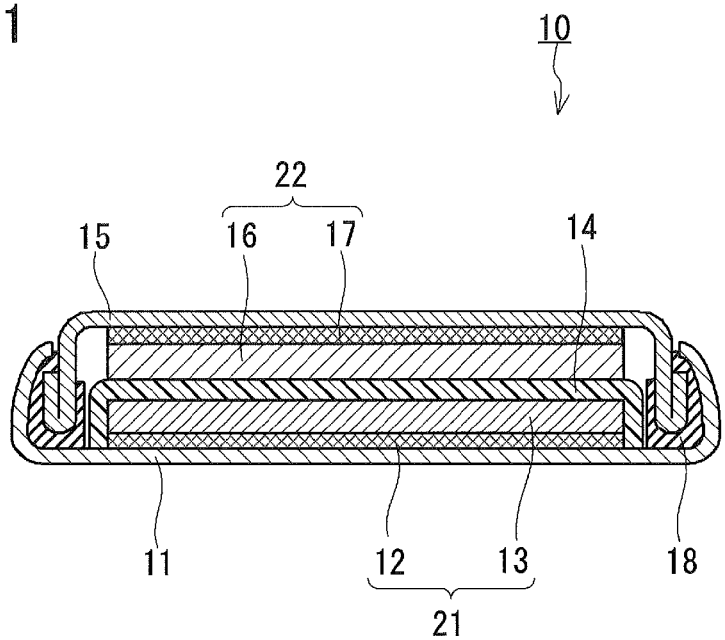
FIG. 1 is a schematic cross-sectional view of a lithium secondary battery according to one embodiment of the present invention.

First, as a common theory, a reaction mechanism in the case where a paraquinone compound is used as an electrode active material is described below. The paraquinone compound has ketone groups as portions that contribute to an oxidation-reduction reaction. Each ketone group has a negative charge. An oxidation-reduction reaction between the paraquinone compound and a migrating carrier having a positive charge (hereinafter simply referred to as a "migrating carrier") proceeds in two steps as indicated by the following formulae (A1) and (B1) in the case where lithium ions are used as the migrating carrier.

[Chemical Formula 5]

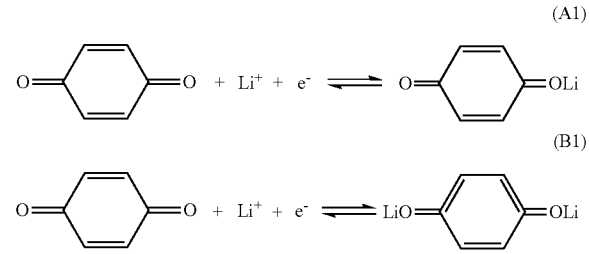

In this two-step reaction, the bond strength between the ketone groups of the paraquinone compound and the lithium ions is determined by the difference between the charge density (negative charge) of the ketone groups and the charge density (positive charge) of the lithium ions. That is, the larger the difference between the charge density of the ketone groups and that of the lithium ions is, the more stable and stronger the bonds between the paraquinone compound and the lithium ions is. The smaller the difference between the charge density of the ketone groups and that of the lithium ions is, the weaker the bonds between the paraquinone compound and the lithium ions is and the easier they are dissociated from each other. In the paraquinone compound, two ketone groups are apart from each other and the charge distribution is localized. Thus, ketone groups of the paraquinone compound have a high charge density, and a charge density that is largely different from that of the lithium ions. Thus, the ketone groups and the lithium ions form therebetween a very strong bond like a covalent bond during a reduction reaction, and go into a stable energy state. This makes it difficult for the lithium ions to be dissociated from the ketone groups during the oxidation reaction. Therefore, reaction reversibility tends to lower easily in the case where the paraquinone compound is used as the electrode active material and the lithium ions are used as the migrating carrier. The phrase "stable energy state" refers to a strongly bonded state in which it is difficult to dissociate the lithium ions by a battery reaction, and does not mean the stability of the compound in a battery reaction.

Moreover, in the paraquinone compound, since two ketone groups are apart from each other, reactions represented by the formulae (A1) and (B1) each have an independent energy level. Specifically, the potential (with respect to lithium) in the first step (one-electron) reaction based on the formula (A1) is as high as 2 to 3V, but the potential (with respect to lithium) in the second step (two-electron) reaction based on the formula (B1) is as low as about 1.0V. Since the potential range actually used in a non-aqueous lithium secondary battery is about 2 to 3V (that is, only the first step is involved), the substantial capacity density of the paraquinone compound is half of that expected when the second electron is assumed to be involved in the charge and discharge.

Next, a reaction mechanism in the case where an orthoquinone compound is used as the electrode active material is described. An oxidation-reduction reaction between the orthoquinone compound and lithium ions proceeds in two steps as represented by the following formulae (A2) and (B2).

[Chemical Formula 6]

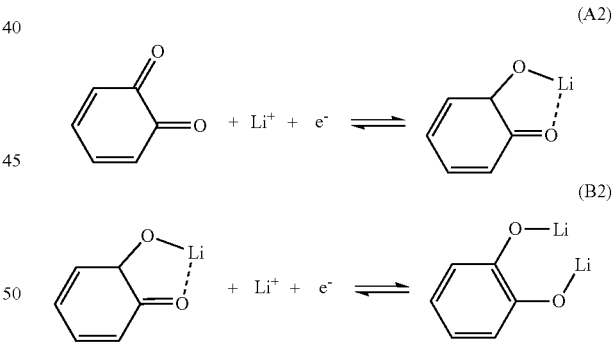

In the orthoquinone compound, two ketone groups are adjacent to each other, and the distribution of the negative charge that each ketone group has is somewhat delocalized compared to that in the paraquinone compound. Thus, in the orthoquinone compound, the bond formed between the ketone group and the lithium ion during a reduction reaction has lower strength than that of the very strong bond like a covalent bond in the paraquinone compound. In the paraquinone compound with the localized charge distribution, one ketone group is always bonded to one lithium ion in one-to-one correspondence. In contrast, in the orthoquinone compound, two ketone groups and one lithium ion are bonded together in the first step (one-electron) reaction represented by the formula (A2), and one lithium ion is bonded to each of the two ketone groups in the second step (two-electron) reaction represented by the formula (B2). That is, the bonds between the ketone groups and the lithium ions are not one-to-one bonding between one ketone group with localized negative charge and one lithium ion, but two-to-two bonding between two ketone groups with delocalized negative charge and two lithium ions. As a result, the bonding strength between the ketone groups and the lithium ions is alleviated. As described above, in the orthoquinone compound, the bonding strength between the lithium ions and the ketone groups is alleviated and thereby the reaction reversibility is enhanced compared to those in the paraquinone compound.

In the orthoquinone compound, since two ketone groups are adjacent to each other, the reaction represented by the formula (A2) has a relatively close energy level to that of the reaction represented by the formula (B2). Specifically, the potential (with respect to lithium) in the first step (one-electron) reaction corresponding to the formula (A2) is close to the potential (with respect to lithium) in the second step (two-electron) reaction corresponding to the formula (B2). The potential in each reaction is about 2 to 3V.

Next, a reaction mechanism in the case where a tetraketone compound is used as the electrode active material is described. An oxidation-reduction reaction between an aromatic tetraketone compound and lithium ions is a four-electron reaction that proceeds in two steps, with two electrons each, as indicated by the following formulae (A3) and (B3).

[Chemical Formula 7]

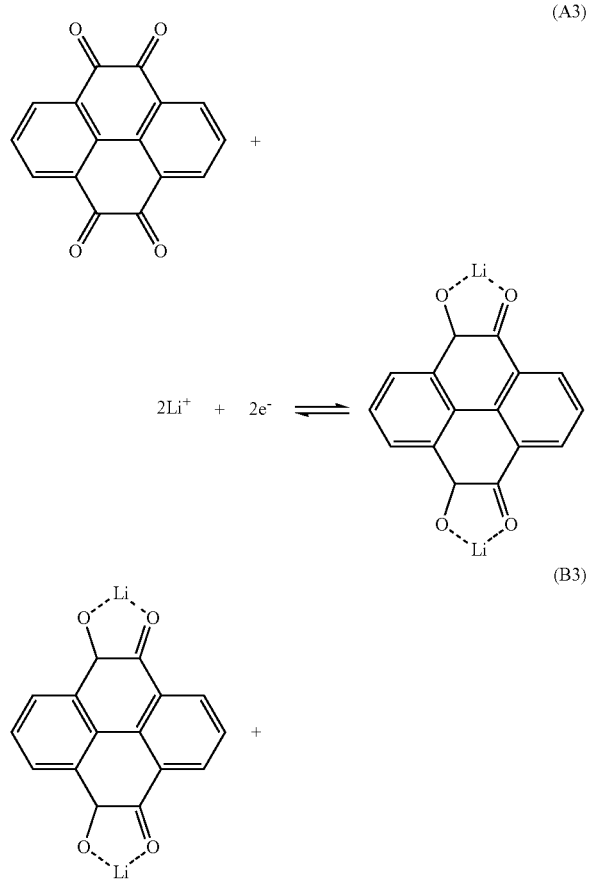

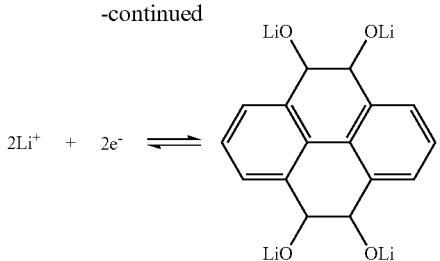

The tetraketone compound (pyrene-4,5,9,10-tetraone) represented by the formulae (A3) and (B3) has an aromatic pyrene ring and four ketone groups. On the pyrene ring, the four ketone groups are symmetric to each other, in which two ketone groups are adjacent to each other. Since the polarized ketone groups are present at symmetric positions on the pyrene ring, the negative charge distribution is further delocalized. Thus, the bonds formed between the ketone groups and the lithium ions during a reduction reaction are made at a higher potential than those in the paraquinone compound and the orthoquinone compound. Two ketone groups and one lithium ion are bonded together in the first step (two-electrons) reaction represented by the formula (A3). Likewise, two ketone groups and one lithium ion are bonded together also in the second step (four-electron) reaction represented by the formula (B3). Through the entire reactions as a whole, four lithium ions are bonded to four ketone groups, respectively. Since the number of the ketone groups per tetraketone compound molecule is larger than the number of the ketone groups per paraquinone compound molecule and the number of the ketone groups per orthoquinone compound molecule, the four-electron reaction can occur and consequently the energy density per molecule is enhanced. In this way, by optimizing the skeletal structure of the tetraketone compound, it is possible to increase both the voltage and capacity of an electricity storage device in which the tetraketone compound is used as the electrode active material. Furthermore, in the tetraketone compound, since the ketone groups adjacent to each other are used for the oxidation-reduction reaction as in the orthoquinone compound mentioned above, satisfactory reversibility also can be expected.

Moreover, in the tetraketone compound, since two ketone groups are adjacent to each other, the reactions represented by the formulae (A3) and (B3) proceed in two steps, with two electrons each. That is, four electrons can contribute to the oxidation-reduction reaction. This indicates that a two-electron reaction can be utilized in the formula (A3) that is substantially a reaction on higher potential side. Therefore, use of the tetraketone compound as the electrode active material makes it possible to obtain an electricity storage device having a high energy density and excellent controllability.

In contrast, in the case where a tetraketone compound has a chain molecular structure, the reaction between the tetraketone compound and lithium ions is represented by the following formula (A4).

[Chemical Formula 8]

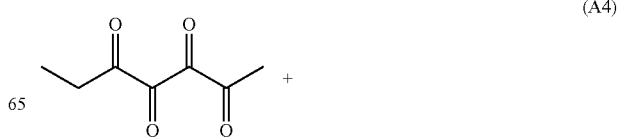

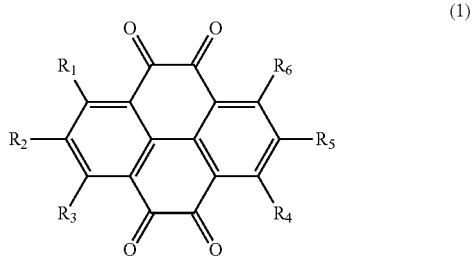

When a monomer tetraketone compound has a chain structure as shown in the formula (A4), there occurs a case where four ketone groups are not adjacent to each other for various reasons such as electrostatic repulsion, steric hindrance, and the difference in the distance between two ketone groups. That is, lithium is not coordinated so as to be sandwiched between two ketone groups, and oxygen and lithium form a bond therebetween in one-to-one correspondence. In this case, the ketone groups (negative charge) are localized and the reaction reversibility is lowered for the same reason as in the paraquinone compound. The reaction potential also is lowered. From this viewpoint, the aromatic tetraketone compound is more promising as the electrode active material than the tetraketone compound having a chain structure.

As the aromatic tetraketone compound, an aromatic tetraketone compound having a pyrene ring can be employed as represented by the formulae (A3) and (B3). Specifically, a compound having a structure represented by the following formula (1) can be used as the electrode active material.

[Chemical Formula 9]

(1)

In the formula (1), $R_1$ to $R_6$ each denote independently a hydrogen atom (except for a case where all of $R_1$ to $R_6$ denote hydrogen atoms), a halogen atom, an optionally substituted phenyl group, an optionally substituted heterocyclic group, or an optionally substituted hydrocarbon group having 1 to 4 carbon atoms. In this description, the phrase "optionally substituted" indicates that at least one hydrogen atom is optionally substituted by an appropriate group.

Examples of the substituent in the optionally substituted phenyl group include a group containing at least one selected from the group consisting of a fluorine atom, a nitrogen atom, an oxygen atom, a sulfur atom, and a silicon atom. Examples of the group containing a fluorine atom include a fluorine atom, a fluoroalkyl group, a fluoroalkenyl group, and a fluoroalkoxy group. Examples of the group containing a nitrogen atom include a nitro group, an amino group, an amide group, an imino group, and a cyano group. Examples of the group containing an oxygen atom include a hydroxyl group, an oxo group, and a carboxyl group. Examples of the group containing a sulfur atom include an alkylthio group, a sulfo group, a sulfino group, a sulfeno group, and a mercapto group. Examples of the group containing a silicon atom include a silyl group.

The heterocyclic group may have a five-membered ring structure or a six-membered ring structure. Specific examples thereof include thiophene, furan, pyrrole, and azole. Cyclic ether, lactone, cyclic imine, lactam, etc. also can form the heterocyclic group. A polycyclic heterocyclic group such purine, and a heterocyclic group, such as thiazole, that has three kinds of elements (C, N, and S) in a ring also can be employed. Examples of the substituent in the optionally substituted heterocyclic group include a group containing at least one selected from the group consisting of a fluorine atom, a nitrogen atom, an oxygen atom, a sulfur atom, and a silicon atom. Examples of the group containing a fluorine atom include a fluorine atom, a fluoroalkyl group, a fluoroalkenyl group, and a fluoroalkoxy group. Examples of the group containing a nitrogen atom include a nitro group, an amino group, an amide group, an imino group, and a cyano group. Examples of the group containing an oxygen atom include a hydroxyl group, an oxo group, and a carboxyl group. Examples of the group containing a sulfur atom include an alkylthio group, a sulfo group, a sulfino group, a sulfeno group, and a mercapto group. Examples of the group containing a silicon atom include a silyl group.

The hydrocarbon group having 1 to 4 carbon atoms may be saturated, may have an unsaturated bond, or may form a ring. Examples of the alkyl group having 1 to 4 carbon atoms include a linear or branched alkyl group having 1 to 4 carbon atoms, such as a methyl group, an ethyl group, a propyl group, an isopropyl group, a butyl group, an isobutyl group, a sec-butyl group, and a tert-butyl group. Examples of an alkenyl group having 2 to 4 carbon atoms include a linear or branched alkenyl group having 1 to 3 double bonds, such as an allyl group, a 1-propenyl group, a 1-methyl-1-propenyl group, a 2-methyl-1-propenyl group, a 2-propenyl group, a 2-butenyl group, a 1-butenyl group, and a 3-butenyl group.

Examples of the substituent in the optionally substituted hydrocarbon group having 1 to 4 carbon atoms include a group containing at least one selected from the group consisting of a fluorine atom, a nitrogen atom, an oxygen atom, a sulfur atom, and a silicon atom. Examples of the group containing a fluorine atom include a fluorine atom, a fluoroalkyl group, a fluoroalkenyl group, and a fluoroalkoxy group. Examples of the group containing a nitrogen atom include a nitro group, an amino group, an amide group, an imino group, and a cyano group. Examples of the group containing an oxygen atom include a hydroxyl group, an oxo group, and a carboxyl group. Examples of the group containing a sulfur atom include an alkylthio group, a sulfo group, a sulfino group, a sulfeno group, and a mercapto group. Examples of the group containing a silicon atom include a silyl group.

The compound in which all of $R_1$ to $R_6$ are hydrogen, that is, pyrene-4,5,9,10-tetraone represented by the formulae (A3) and (B3), is dissolved more easily in the electrolyte of an electricity storage device in some cases, and does not always have sufficient properties in the viewpoint of achieving desired charging and discharging cycle characteristics. In contrast, in the case where at least one selected from $R_1$ to $R_6$ is a halogen atom, an optionally substituted phenyl group, an optionally substituted heterocyclic group, or an optionally substituted hydrocarbon group having 1 to 4 carbon atoms, the solubility of the tetraketone compound represented by the formula (1) in an electrolyte (particularly a liquid electrolyte) can be lower than in the case where all of $R_1$ to $R_6$ are hydrogen. Therefore, it is possible to improve the charging and discharging cycle characteristics of an electricity storage device in which the tetraketone compound represented by the formula (1) is used as the electrode active material.

It is known that the solubility of an electrode active material in an electrolyte depends not only on the polarity of the electrode active material but also the crystallinity of the electrode active material. Usually, the electrode active material is dissolved more easily in an electrolyte when having low crystallinity, and it is dissolved poorly in an electrolyte when having high crystallinity.

Usually, to improve the crystallinity of a certain molecule, it is effective to increase the force (intermolecular force) acting between the molecules. When the intermolecular force is larger than the force acting between the molecule and the solvent, the molecule is dissolved poorly in a solvent. Conceivably, in the compound in which all of $R_1$ to $R_6$ are hydrogen, that is, in pyrene-4,5,9,10-tetraone represented by the formulae (A3) and (B3), a π-conjugated electron cloud is spread in the entire molecule and the molecules interact with each other because of the overlap of the π-conjugated electron clouds, and thereby the compound tends to have a stack structure (=to be in a crystalline state) in which the molecules are overlapped with each other. However, pyrene-4,5,9,10-tetraone is dissolved easily in a carbonate solvent. Conceivably, this is because in a carbonate solvent, pyrene-4,5,9,10-tetraone can be present more stably when being solvated in the solvent than when being in the crystalline state, although this depends on the type of the solvent. Thus, it is conceived that unsubstituted pyrene-4,5,9,10-tetraone is dissolved easily in the electrolyte of an electricity storage device in some cases. To increase the intermolecular force, it is effective to form a π-conjugated electron cloud that is more spread on the molecule. The π-conjugated electron clouds are overlapped further with each other between the molecules, so that the intermolecular force is increased. To form the π-conjugated electron cloud, it is most effective to introduce an aromatic substituent such as a phenyl group. As another method, it is effective to introduce halogen. This is because the introduction of halogen, which has high polarity, usually lowers the solubility of a compound significantly.

Also, a halogen atom, a phenyl group, a heterocyclic group, and a hydrocarbon group having 1 to 4 carbon atoms are unlikely to hinder the bonding and dissociation of the lithium ions and to cause the localization of charge distribution. Thus, even in the case where at least one selected from $R_1$ to $R_6$ is any of these groups, the tetraketone compound represented by the formula (1) can have a high energy density and high discharge potential.

A saturated hydrocarbon group having 1 to 4 carbon atoms has low polarity and does not so much contribute to the compound properties and the formation of π-conjugated electron cloud. However, the saturated hydrocarbon group having 1 to 4 carbon atoms is conceived to have the effect of increasing the intermolecular force in the tetraketone compound, and it is effective in lowering solubility of the compound. Conversely, in the case where a saturated hydrocarbon group having five or more carbon atoms is introduced in the tetraketone compound, the tetraketone compound has a bulky structure and the intermolecular force is decreased. As a result, the solubility of the tetraketone compound tends to be increased. Thus, for example, a saturated hydrocarbon group having 1 to 4 carbon atoms, particularly a halogenated saturated hydrocarbon group (halogenated alkyl group), is recommended when a saturated hydrocarbon group is employed as $R_1$ to $R_6$.

Preferably, $R_1$, $R_3$, $R_4$ and $R_6$ each denote a hydrogen atom. $R_2$ and $R_5$ each can be independently a hydrogen atom (except for a case where both of $R_2$ and $R_5$ denote hydrogen atoms), a halogen atom, an optionally substituted phenyl group, an optionally substituted heterocyclic group, or an optionally substituted hydrocarbon group having 1 to 4 carbon atoms. It is relatively easy to replace the hydrogen bonded to carbon at the second position and the hydrogen bonded to carbon at the seventh position on the pyrene ring with other groups, and high yield also can be expected in this case. For example, aromatic tetraketone compounds having structures represented by the following formulae (2) to (5), respectively, can be used suitably as the electrode active material.

[Chemical Formula 10]

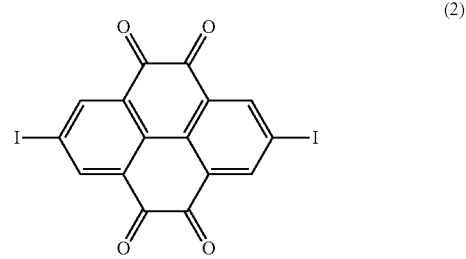

(2)

[Chemical Formula 11]

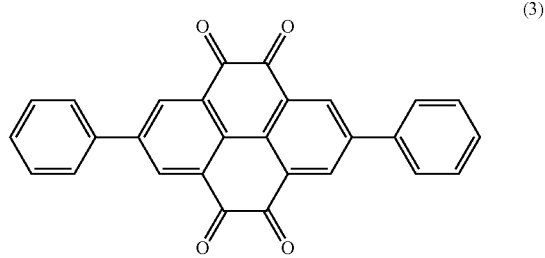

(3)

[Chemical Formula 12]

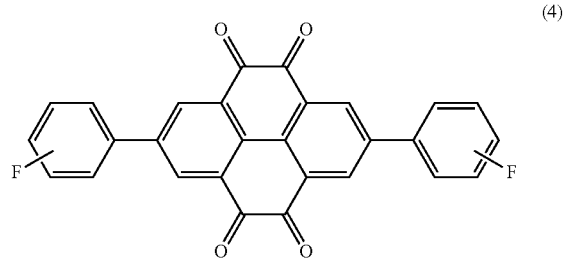

(4)

[Chemical Formula 13]

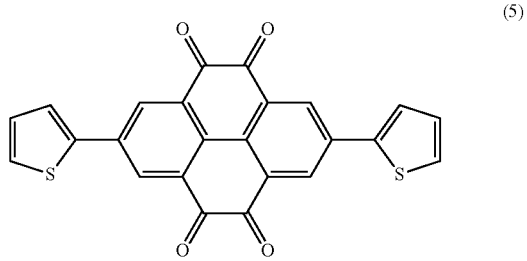

(5)

Each of these compounds can be synthesized by the following method, for example. An arbitrary substituent is introduced to an arbitrary position on a pyrene ring in advance. Then, in a mixed solvent containing acetonitrile, water and toluene, four ketone groups are introduced into the pyrene ring by using ruthenium chloride and sodium periodate. In addition, halogen, such as iodine and bromine, is introduced into the pyrene ring. This halogen and a substituent in which boronic acid is introduced are subject to coupling, or this halogen and a substituent in which boronic acid ester is introduced are subject to coupling. Thereby, an aromatic tetraketone compound having a desired substituent can be synthesized. Alternatively, four ketone groups are introduced into a pyrene ring by using sodium periodate and ruthenium chloride, so that a tetraketone compound is synthesized first. Then, a substituent is introduced to an arbitrary position on the pyrene ring. Halogen, such as iodine and bromine, further is introduced into the pyrene ring. This halogen and a substituent in which boronic acid is introduced are subject to coupling, or this halogen and a substituent in which boronic acid ester is introduced are subject to coupling. Thereby, an aromatic tetraketone compound having a desired substituent can be synthesized.

As a method to lower the solubility in an electrolyte, the method of polymerizing the aromatic tetraketone compound, instead of the introduction of a specified substituent or in addition to the introduction of the substituent, can be proposed. That is, it is possible to employ suitably an electrode active material that is formed as a polymer compound containing the structure represented by the formula (1) as a repeating unit. Usually, a polymer compound has lower solubility than that of a monomer. The polymerization of the aromatic tetraketone compound is effective to lower the solubility in various solvents. Specifically, a compound having a repeating unit represented by the following formula (6) can be used as the electrode active material.

[Chemical Formula 14]

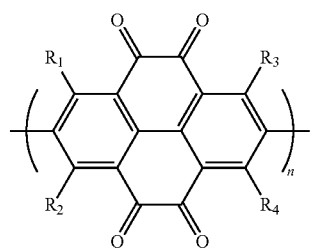

(6)

In the formula (6), $R_1$ to $R_4$ each denote independently a hydrogen atom, a halogen atom, an optionally substituted hydrocarbon group, or an optionally substituted heterocyclic group.

Example of the hydrocarbon group in the optionally substituted hydrocarbon group include a phenyl group, an alkyl group having 1 to 4 carbon atoms, an alkenyl group having 2 to 4 carbon atoms, a cycloalkyl group having 3 to 6 carbon atoms, a cycloalkenyl group having 3 to 6 carbon atoms, an aryl group, and an aralkyl group. Examples of the substituent in the optionally substituted hydrocarbon group include a group containing at least one selected from the group consisting of a fluorine atom, a nitrogen atom, an oxygen atom, a sulfur atom, and a silicon atom. Examples of the group containing a fluorine atom include a fluorine atom, a fluoroalkyl group, a fluoroalkenyl group, and a fluoroalkoxy group. Example of the group containing a nitrogen atom include a nitro group, an amino group, an amide group, an imino group, and a cyano group. Examples of the group containing an oxygen atom include a hydroxyl group, an oxo group, and a carboxyl group. Examples of the group containing a sulfur atom include an alkylthio group, a sulfo group, a sulfino group, a sulfeno group, and a mercapto group. Examples of the group containing a silicon atom include a silyl group.

As the heterocyclic group in the optionally substituted heterocyclic group, the same heterocyclic groups as those described for the formula (1) above can be mentioned. Likewise, as the substituent in the optionally substituted heterocyclic group, the same substituents as those described for the formula (1) above can be mentioned.

The mechanism of the lowering of solubility in a polymer compound is different from that in a monomer. Therefore, no particular inconvenience arises no matter what type of substituent the hydrocarbon group and the heterocyclic group each have as the substituent for a hydrogen atom.

In the formula (6), the number n of repeating units is an integer of two or more. To improve sufficiently the charging and discharging cycle characteristics of the electricity storage device, the number n of repeating units preferably is large to some extent. However, from the viewpoints such as cost, yield, and productivity, it is difficult in some cases to increase considerably the number n of repeating units. On the other hand, it is relatively easy to obtain a dimer and a trimer, but the effect of improving the charging and discharging cycle characteristics may be limited. Therefore, in the formula (6), the number n of repeating units is in the range of, for example, 4 to 100 (or 6 to 50) as the average value after the polymerization reaction.

In another aspect, the compound having a repeating unit represented by the formula (6) can have a number-average molecular weight in the range of, for example, 3000 to 50000 (or 5000 to 50000). In other words, the compound represented by the formula (6) has such a repeating number n that realizes a number-average molecular weight in the above-mentioned range. Although a compound having an average molecular weight of 10,000 or more is usually classified as a polymer compound, a compound having a number average molecular weight of about 3000 is also classified as a polymer compound in this description.

Examples of the compound represented by the formula (6) include compounds represented by the following formulae (7) to (9).

[Chemical Formula 15]

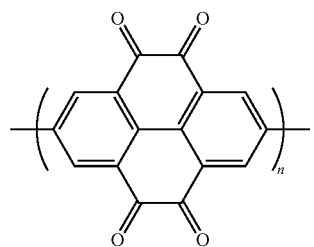

(7)

[Chemical Formula 16]

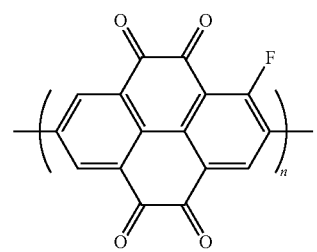

(8)

[Chemical Formula 17]

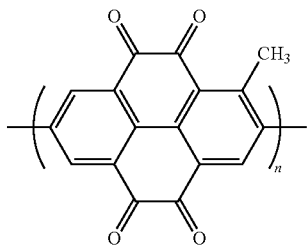

(9)

Furthermore, a compound having a repeating unit represented by the following formula (10) can be used as the electrode active material. Likewise, a compound having a repeating unit represented by the following formula (11) also can be used as the electrode active material. The following description about the formula (10) can be applied also to the formula (11).

[Chemical Formula 18]

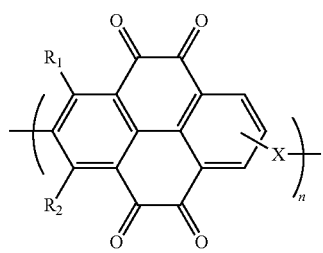

(10)

[Chemical Formula 19]

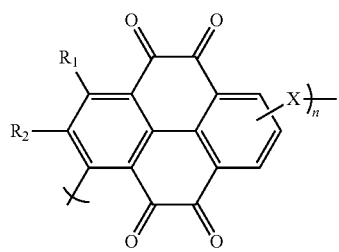

(11)

In the formula (10), $R_1$ and $R_2$ each denote independently a hydrogen atom, a halogen atom, an optionally substituted hydrocarbon group, or an optionally substituted heterocyclic group.

As the hydrocarbon group in the optionally substituted hydrocarbon group, the same hydrocarbon groups as those described for the formula (6) above can be mentioned. Likewise, as the substituent in the optionally substituted hydrocarbon group, the same substituents as those described for the formula (6) above can be mentioned.

As the heterocyclic group in the optionally substituted heterocyclic group, the same heterocyclic groups as those described for the formula (1) above can be mentioned. Likewise, as the substituent in the optionally substituted heterocyclic group, the same substituents as those described for the formula (1) above can be mentioned.

In the formula (10), X denotes a linker. The linker is a group for connecting repeating units (pyrene rings in the present embodiment) adjacent to each other. X is not particularly limited as long as a smooth polymerization reaction can be achieved. X can be composed of, for example, an aromatic compound. Use of an aromatic compound as the linker makes it possible to cause polymerization without impairing the oxidation-reduction characteristics of the tetraketone skeletons (pyrene rings). Preferably, the aromatic compound is at least one selected from the group consisting of a monocyclic aromatic compound, a condensed-ring aromatic compound containing a plurality of six-membered rings, a condensed-ring aromatic compound containing at least one five-membered ring and at least one six-membered ring, and a heterocyclic aromatic compound.

Specific examples of the monocyclic aromatic compound include benzene and a benzene derivative. Specific examples of the condensed-ring aromatic compound containing a plurality of six-membered rings include naphthalene, a naphthalene derivative, anthracene, and an anthracene derivative. Specific examples of the condensed-ring aromatic compound containing at least one five-membered ring and at least one six-membered ring include fluorene and a fluorene derivative. Examples of the heterocyclic aromatic compound include a five-membered ring or six membered-ring heterocyclic aromatic compound, such as thiophene, pyridine, pyrrole and furan, that has a nitrogen atom, an oxygen atom or a sulfur atom as a hetero atom. Among these, a five-membered ring compound having a sulfur atom as a hetero atom is preferable. The "benzene derivative" is an aromatic compound in which various substituents are bonded to benzene. This is also the case with the other derivatives.

Furthermore, X may have a substituent. Specifically, X may have, as the substituent for a hydrogen atom, at least one selected from the group consisting of a fluorine atom, a group containing a sulfur atom, a group containing a nitrogen atom, a saturated aliphatic group, and an unsaturated aliphatic group.

Examples of the group containing a sulfur atom include an alkylthio group, a sulfo group, a sulfeno group, a sulfeno group, and a mercapto group. Examples of the group containing a nitrogen atom include a nitro group, an amino group, an amide group, an imino group, and a cyano group. Examples of the saturated aliphatic group include an alkyl group and a cycloalkyl group. Examples of the alkyl group include a linear or branched alkyl group having 1 to 6 carbon atoms, such as a methyl group, an ethyl group, a propyl group, an isopropyl group, a butyl group, a tert-butyl group, a sec-butyl group, a pentyl group, and a hexyl group. Examples of the cycloalkyl group include a cycloalkyl group having 3 to 8 carbon atoms, such as a cyclopropyl group, a cyclobutyl group, a cyclopentylic group, a cyclohexyl group, and a cyclopeptyl group, a cyclooctyl group. Examples of the unsaturated aliphatic group include an alkenyl group, an alkynyl group, and a cycloalkenyl group. Examples of the alkenyl group include a linear or branched alkenyl group having 2 to 6 carbon atoms, such as a vinyl group, an allyl group, 2-butenyl group, 3-butenyl group, 1-methylallyl group, 2-pentenyl group, and 2-hexenyl group. Examples of the cycloalkenyl group include a cycloalkenyl group having 3 to 8 carbon atoms, such as a cyclopropenyl group, a cyclobutenyl group, a cyclopentenyl group, a cyclohexenyl group, a cycloheptenyl group, and a cyclooctenyl group. Examples of the alkynyl group include a linear or branched alkynyl group having 2 to 4 carbon atoms, such as an ethynyl group, 1-propynyl group, 2-propynyl group, 1-methyl-2-propynyl group, 1-butynyl group, 2-butynyl group, and 3-butynyl group.

In the formula (10), the number n of repeating units is in the range of, for example, 4 to 100 (or 6 to 50). This is for the same reason as that described for the formula (6). In another aspect, the compound having a repeating unit represented by the formula (10) can have a number-average molecular weight in the range of, for example, 3000 to 50000 (or 6000 to 50000). In other words, the compound represented by the formula (10) can have such a repeating number n that realizes a number-average molecular weight in the above-mentioned range. Use of the linker may allow the polymerization reaction to proceed extremely easily in some cases, although the reason for this is not so clear. In these cases, the number n of repeating units and the number-average molecular weight can far exceed the above-mentioned values.

The formula (10) represents a polymer compound containing a repeating unit including the structure represented by the formula (1), that is, a tetraketone skeleton, and a repeating unit (linker X) including no quinone portion. Examples of the compound represented by the formula (10) include compounds represented by the following formulae (12) to (15). Examples of the compound represented by the formula (11) include compounds represented by the following formulae (16) to (18).

[Chemical Formula 20]

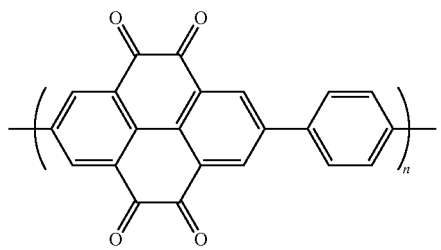
(12)

[Chemical Formula 21]

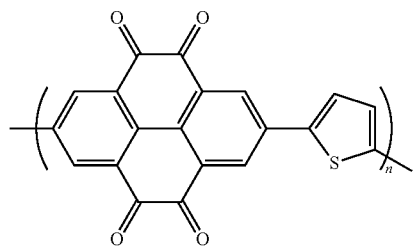
(13)

[Chemical Formula 22]

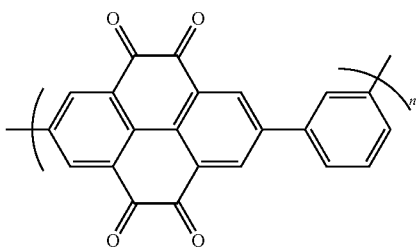
(14)

[Chemical Formula 23]

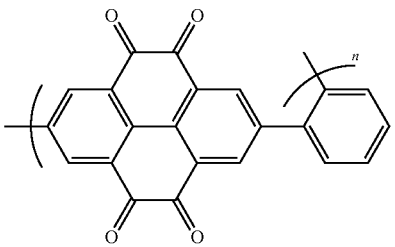
(15)

[Chemical Formula 24]

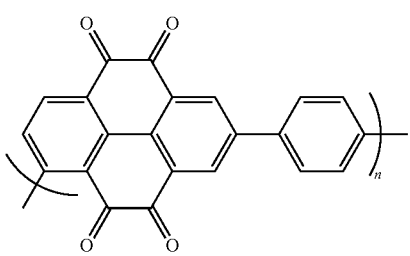
(16)

[Chemical Formula 25]

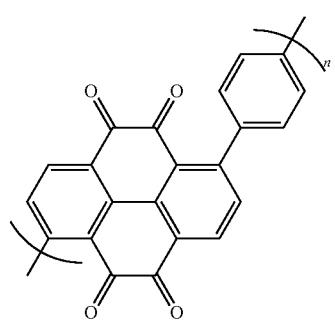
(17)

[Chemical Formula 26]

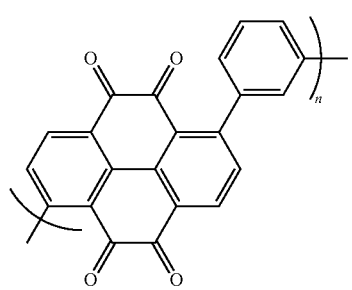
(18)

These compounds can be synthesized by allowing an aromatic tetraketone compound in which halogen is introduced to react with an arbitrary linker in which diboronic acid or diboronic acid ester is introduced by a method such as Suzuki-Miyaura coupling method.

The above-mentioned electrode active materials of the present embodiment each may be used alone, or two or more of them may be used in combination. The monomer (formula (1)) and the polymer compounds (formulae (6) and (10)) may be used in combination.

Moreover, the polymer compound that contains a repeating unit including a tetraketone skeleton and a repeating unit including no quinone portion may contain a tetraketone skeleton in a side chain. For example, a polymer compound having two repeating units represented by the following formula (19) can be used as the electrode active material. The two repeating units are bonded to each other at symbols *.

[Chemical Formula 27]

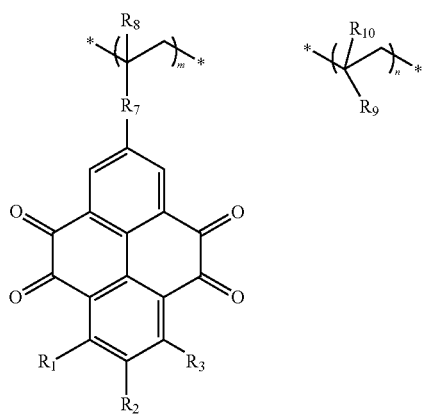

(19)

In the formula (19), $R_1$, $R_2$ and $R_3$ each denote independently a hydrogen atom, a halogen atom, an optionally substituted hydrocarbon group, or an optionally substituted heterocyclic group. $R_7$ denotes an alkylene chain having 1 to 4 carbon atoms, an alkenylene chain having 1 to 4 carbon atoms, an arylene chain, an ester bond, an amide bond, or an ether bond, and is optionally substituted. $R_9$ contains at least one selected from the group consisting of an ester group, an ether group, a carbonyl group, a cyano group, a nitro group, a nitroxyl group, an alkyl group, a phenyl group, an alkylthio group, a sulfone group, and a sulfoxide group. $R_8$ and $R_{10}$ each denote independently a saturated aliphatic group having 1 to 4 carbon atoms, a phenyl group, or a hydrogen atom. n and m each denote an integer of 2 or more.

The alkylene chain having 1 to 4 carbon atoms refers to a linear or branched alkylene chain. Specific examples thereof include a methylene group, an ethylene group, a trimethylene group, a tetramethylen group, a butylene group, and an eylmethylene chain. A hydrogen atom in the alkylene chain may be substituted by a substituent containing 1 to 3 fluorine atoms, an oxygen atom, a sulfur atom, etc. The alkenylene chain having 1 to 4 carbon atoms refers to a linear or branched alkenylene chain. Specific examples thereof include vinyl, 1-propenyl, 2-propenyl, isopropenyl, 2-methyl-1-propenyl, 3-methyl-1-propenyl, 2-methyl-2-propenyl, 3-methyl-2-propenyl, 1-butenyl, 2-butenyl, and 3-butenyl. A hydrogen atom in the alkenylene chain may be substituted by a substituent containing an oxygen atom, a sulfur atom, etc.

In a polymer containing a tetraketone skeleton in a side chain, the tetraketone skeletons located in the side chains tend to be adjacent to each other easily. Thus, in some cases, it is difficult to ensure a migration path for a counter ion during an oxidation-reduction reaction. For the purpose of ensuring the migration path for the counter ion, a first monomer having a tetraketone skeleton in a side chain is copolymerized with a second monomer having no tetraketone skeleton. Thereby, the steric hindrance in the vicinity of the tetraketone skeleton is reduced, the oxidation-reduction reaction between the ketone portion and the counter ion (lithium ion) is made more easily, and satisfactory cycle characteristics can be achieved.

A polymer having only a tetraketone skeleton in a side chain (a polymer that does not have a portion containing no tetraketone skeleton) has low solubility in a solvent. In a copolymer of the first monomer and the second monomer mentioned above, the tetraketone skeletons are unlikely to be adjacent to each other. On the other hand, it is easy for solvent molecules to approach the entire polymer, making it easy for the polymer to be in a solvated state. By selecting appropriately the substituents (specifically $R_9$ and $R_{10}$ in the formula (19)) in the monomer (second monomer) containing no tetraketone skeleton, it is possible to allow the polymer to have selective solubility such that it is not dissolved in an electrolytic solution but dissolved only in a specified solvent. This makes the polymer applicable to various electrode production methods.

As a structure having such chemical properties, there can be mentioned an oxygen-containing functional group such as an ester group, an ether group and a carbonyl group, a nitrogen-containing functional group such as a cyano group, a nitro group and a nitroxyl group, a functional group, such as an alkyl group and a phenyl group, that is composed of carbon, and a sulfur-containing functional group such as an alkylthio group, a sulfone group and a sulfoxide group. Preferably, a side chain containing no tetraketone skeleton includes at least one selected from the group consisting of an ester group, an ether group, and a carbonyl group.

Terminal parts of functional groups of an ester group, an ether group, a carbonyl group, a sulfone group, and a sulfoxide group are not particularly limited. However, an alkyl group, such as a methyl group and an ethyl group, that has a small number of carbon atoms, or an aromatic group is desirable. Preferable examples of the ester group include alkyl ester represented by (—COO—$CH_3$) or (—COO—$C_2H_5$), and phenyl ester (—COO—$C_6H_5$). Preferable examples of the ether group include alkyl ether represented by (—O—$CH_3$) or (—O$C_2H_5$), and phenyl ether (—O—$C_6H_5$). Preferable examples of the carbonyl group include (—C(=O)—$CH_3$), (—C(=O)—$C_2H_5$) and (—C(=O)—$C_6H_5$). Preferable examples of the sulfone group include (—S(=O)$_2$—$CH_3$), (—S(=O)$_2$—$C_2H_5$), and (—S(=O)$_2$—$C_6H_5$). Preferable examples of the sulfoxide group include (—S(=O)—$CH_3$), (—S(=O)—$C_2H_5$), and (—S(=O)—$C_6H_5$).

Examples of the compound represented by the formula (19) include a compound represented by the following formula (20).

[Chemical Formula 28]

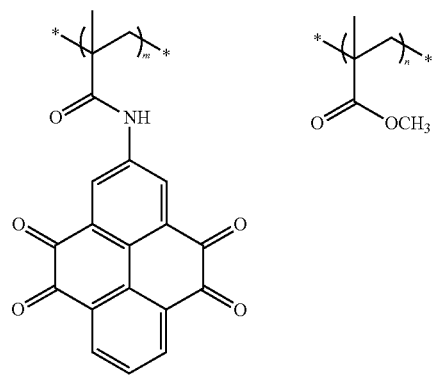

(20)

The structure of the main chain of a polymer compound that can be used as the electrode active material is not particularly limited. It may contain, a trivalent residue (as a repeating unit, for example) containing at least one selected from the group consisting of a carbon atom, an oxygen atom, a nitrogen atom, and a sulfur atom. For example, the polymer compound represented by the formula (19) may include a repeating unit (a third repeating unit) other than the repeating units represented by the formula (19). Such a repeating unit may contain at least one substituent selected from the group consisting of a saturated aliphatic group having 1 to 10 carbon atoms and an unsaturated aliphatic group having 2 to 10 carbon atoms. Specific example thereof include a repeating unit containing saturated hydrocarbon such as polyethylene and polypropylene, an unsaturated hydrocarbon such as polyacetylene, and an aromatic ring such as polycarbonate and polystyrene, and a repeating unit obtained by substituting a part of protons of these by halogen.

Next, an electricity storage device in which each of the above-mentioned electrode active materials of the present embodiment can be used is described. FIG. 1 is a schematic cross-sectional view of a coin-type lithium secondary battery as one example of the electricity storage device. As shown in FIG. 1, a lithium secondary battery 10 includes a positive electrode 21, a negative electrode 22, a separator 14 disposed between the positive electrode 21 and the negative electrode 22, and an electrolyte. A case 11 accommodates these elements by use of a gasket 18 and a sealing plate 15. At least one of the positive electrode 21 and the negative electrode 22 contains a tetraketone compound of the present embodiment as an electrode active material. That is, the electrode active material of the present embodiment can be used for both of the positive electrode 21 and the negative electrode 22, or for one of them. In the case where the electrode active material of the present embodiment is used for one of the positive electrode 21 and the negative electrode 22, a conventional electrode active material can be used for the other.

The positive electrode 21 has, for example, a positive electrode current collector 12, and a positive electrode active material layer 13 formed on the positive electrode current collector 12. The positive electrode active material layer 13 is disposed between the positive electrode current collector 12 and the separator 14 so as to be in contact with both of the positive electrode current collector 12 and the separator 14.

As the positive electrode current collector 12, it is possible to use a porous or nonporous sheet made of, for example, a metal material such as aluminum, stainless steel and aluminum alloy. Examples the sheet made of a metal material include a metal foil and a mesh body. A carbon material, such as carbon, may be applied to a surface of the positive electrode current collector 12 in order to (i) reduce electrode resistance, (ii) provide a catalytic effect, and (iii) strengthen the bond between the positive electrode active material layer 13 and the positive electrode current collector 12 by bonding chemically or physically the positive electrode active material layer 13 to the positive electrode current collector 12.

The positive electrode active material layer 13 is provided on at least one surface of the positive electrode current collector 12. The positive electrode active material layer 13 contains a positive electrode active material, and may contain, as needed, a conducting agent, an ion-conducting agent, a binder, etc.

The conducting agent and the ion-conducting agent are used to reduce electrode resistance. Examples of the conducting agent include a carbon materials such as carbon black, graphite and acetylene black, and a conductive polymer compound such as polyaniline, polypyrrole and polythiophene. Examples of the ion-conducting agent include a gel electrolyte such as polymethylmethacrylate, and a solid electrolyte such as polyethylene oxide.

It is possible to produce the positive electrode 21 by mixing the positive electrode active material (a polymer compound containing a tetraketone skeleton in a molecule, for example), the conducting agent, and the binder that are powdery, and forming a sheet from the mixture, and pressure-bonding the formed sheet onto a sheet or mesh current collector. Alternatively, it also is possible to produce the positive electrode 21 by mixing the positive electrode active material, the conducting agent, the binder and an organic solvent to prepare a slurry, and applying the slurry to a current collector, and then removing the organic solvent. In this case, the positive electrode active material is dissolved in the organic solvent, and then the other materials, such as the conducting agent and the binder, are mixed therewith to prepare a slurry, and this slurry is used to produce the positive electrode 21.

The slurry can be prepared by dissolving the electrode active material in an aprotic solvent and mixing the resultant solution with the conducting agent. It also is possible to dissolve the electrode active material in a mixture containing an aprotic solvent and the conducting agent. Moreover, the mixture may contain a binder. The after-mentioned binders can be used as the binder. The conducting agent and the binder do not need to be dissolved in the aprotic solvent. Moreover, in the case where the mixture contains the binder, the respective materials can be mixed in an arbitrary order. Desirably, the electrode active material is dissolved in the aprotic solvent and dispersed uniformly therein. In the case where the electrode active material is dissolved in the aprotic solvent and mixed with the conducting agent, the surface of the conducting agent is coated with the electrode active material that is in a molecular state. Thus, it is desirable that in order to be dispersed uniformly, the electrode active material is dissolved in the aprotic solvent.

The aprotic solvent is not particularly limited. An aprotic solvent having high affinity for each electrode active material mentioned above is preferable. Specifically, an aprotic solvent, such as N-methylpyrrolidone (NMP), 1,3-dimethyl-2-imidazolidinone (DMI), tetrahydrofuran (THF), toluene, dimethylformamide (DMF), dimethylacetamide (DMAc), dimethylsulfoxide (DMSO) and chloroform, is preferable, and NMP, DMI and THF are particularly preferable.

The binder is used to, for example, enhance the binding property of the materials composing the electrode. Examples of the binder include polyvinylidene fluoride, a vinylidene fluoride-hexafluoropropylene copolymer, a vinylidene fluoride-tetrafluoroethylene copolymer, polytetrafluoroethylene, styrene-butadiene copolymer rubber, polypropylene, polyethylene, and polyimide.

The negative electrode 22 has, for example, a negative electrode current collector 17, and a negative electrode active material layer 16 formed on the negative electrode current collector 17. The negative electrode active material layer 16 is disposed between the negative electrode current collector 17 and the separator 14 so as to be in contact with both of the negative electrode current collector 17 and the separator 14.

As the negative electrode current collector 17, it is possible to use a porous or nonporous sheet made of, in addition to the metal material described for the positive electrode current collector 12, a metal material such as copper, nickel, copper alloy and nickel alloy. A carbon material may be applied to a surface of the negative electrode current collector 17 in order to reduce electrode resistance, provide a catalytic effect, and strengthen the bond between the negative electrode active material layer 16 and the negative electrode current collector 17.

The negative electrode active material layer 16 is provided on at least one surface of the negative electrode current collector 17. The negative electrode active material layer 16 contains a negative electrode active material, and may contain, as needed, a conducting agent, an ion-conducting agent, a binder, etc. Specifically, the same conducting agent, ion-conducting agent, and binder as those contained in the positive electrode active material layer 13 can be used.

In the case where the electrode active material of the present embodiment is used for the positive electrode 21, a material capable of absorbing and desorbing a lithium ion is used as the negative electrode active material. Examples of the material capable of absorbing and desorbing a lithium ion include: a carbon material such as carbon, graphitized carbon (graphite), and amorphous carbon; a lithium metal; a lithium compound such as a lithium-containing composite nitride and a lithium-containing titanium oxide; Si; an Si compound such as an Si oxide and an Si alloy; Sn; an Sn compound such as an Sn oxide and an Sn alloy.

Preferably, the electrode active material of the present embodiment is used as the positive electrode active material. In this case, the material capable of absorbing and desorbing a lithium ion is used as the negative electrode active material and an arbitrary non-aqueous electrolyte is used as the electrolyte, so that the battery 10 can be fabricated. The electrode active material of the present embodiment has no lithium ion, and thus in the case of using it as the positive electrode active material, the negative electrode active material needs to have a lithium ion in advance. For example, when a material, such as a carbon material, Si, an Si compound, Sn, and an Sn compound, that has no lithium is used as the negative electrode active material, the step of causing the negative electrode active material layer 16 to absorb lithium is performed after the negative electrode active material layer 16 is formed on the negative electrode current collector 17. Specifically, lithium is deposited on the negative electrode active material layer 16 by a known method, such as vapor deposition and sputtering, so that the lithium is diffused in the negative electrode active material layer 16. Thereby, the negative electrode 22 with lithium absorbed therein in advance can be produced. The negative electrode 22 may be heat-treated in order to accelerate the diffusion of the deposited lithium in the negative electrode active material layer 16. It is also possible cause the negative electrode 22 to absorb lithium by placing a lithium metal foil on the negative electrode active material layer 16 and heat-treating it.

In the case where the electrode active material of the present embodiment is used for the negative electrode 22, it is possible to use, as the positive electrode active material, a lithium-containing metal oxide such as $LiCoO_2$, $LiNiO_2$ and $LiMn_2O_4$, activated carbon, an organic compound that can be oxidized and reduced, etc. Examples of the organic compound that can be oxidized and reduced include an organic compound, typified by a tetrathiafulvalene ring, that has a π-conjugated electron cloud in a molecule, and an organic compound, typified by a nitroxyl radical, that has a stable radical in a molecule.

As the separator 14, a material, such as a microporous sheet, a woven fabric and a nonwoven fabric, that has a specified ion permeability, mechanical strength and insulation is used. Usually, the microporous sheet, a woven fabric and a nonwoven fabric each are made of a resin material. From the viewpoints of durability, shutdown function and safety of the battery, the separator 14 preferably is made of polyolefin such as polyethylene and polypropylene. The shutdown function is a function to close a through hole when the amount of heat generated by the battery 10 increases significantly, thereby suppressing the ion permeation and stopping the battery reaction.

As the electrolyte, a liquid electrolyte, a solid electrolyte, and a gel electrolyte can be used, for example. The liquid electrolyte includes a solvent and a supporting salt. As the supporting salt, there can be mentioned a supporting salt usually used for lithium ion batteries and non-aqueous electric double layer capacitors. Specifically, a supporting salt formed of the following cation and anion can be mentioned. Examples of the cation include a cation of alkali metal such as lithium, sodium and potassium, a cation of alkaline earth metal such as magnesium, and a cation of quaternary ammonium such as tetraethylammonium and 1,3-ethylmethyl imidazolium. These cations each may be used alone, or two or more of them may be used in combination. Examples of the anion include a halide anion, a perchlorate anion, a trifluoromethanesulfonate anion, a tetraborofluoride anion, a trifluorophosphorus hexafluoride anion, a trifluoromethanesulfonate anion, a bis(trifluoromethanesulfonyl)imide anion, and a bis(perfluoroethylsulfonyl)imide anion. These anions each may be used alone, or two or more of them may be used in combination. As the supporting salt, a lithium salt composed of a lithium cation and the above-mentioned anion is preferable.

In the case where the supporting salt is liquid, the supporting salt may be or may not be mixed with a solvent. In the case where the supporting salt is solid, it is preferable that a solution obtained by dissolving the supporting salt in an appropriate solvent is used as the electrolyte. As the solvent, there can be used a common solvent in the field of lithium ion batteries and non-aqueous electric double layer capacitors, such as ethylene carbonate, propylene carbonate, dimethyl carbonate, diethyl carbonate, methylethyl carbonate, γbutyllactone, tetrahydrofuran, dioxolane, sulfolane, dimethylformamide, and acetonitrile. These organic solvents each may be used alone, or two or more of them may be used in combination.

Examples of the solid electrolyte include a $Li_2S$—$SiS_2$-lithium compound (here, the lithium compound is at least one selected from the group consisting of $Li_3PO_4$, LiI, and $Li_4SiO_4$), $Li_2S$—$P_2O_5$, $Li_2S$—$B_2S_5$, $Li_2S$—$P_2S_5$—$GeS_2$, sodium/alumina ($Al_2O_3$), amorphous polyether with a low phase transition temperature (Tg), an amorphous vinylidene fluoride copolymer, a blend of different polymers, and polyethylene oxide.

Examples of the gel electrolyte include a mixture of a resin material, a solvent and a supporting salt. Examples of the resin material include polyacrylonitrile, a copolymer of ethylene and acrylonitrile, and a polymer obtained by cross-linking these. Examples of the solvent include a low molecular weight organic solvent such as ethylene carbonate and propylene carbonate. As the supporting salt, those described above can be used. The solid electrolyte and the gel electrolyte can serve as the separator 14 as well.

Examples of the electricity storage device in which the electrode active material described in the present embodiment can be used include a primary battery, a secondary battery, and a capacitor. The capacitor can be configured with an electrode composed of the electrode active material of the present embodiment and a counter electrode containing activated carbon.

EXAMPLES

Hereinafter, examples of the present invention are described in detail. However, the present invention is not limited to these examples.

Synthesis Example 1

Pyrene-4,5,9,10-tetraone (hereinafter referred to as compound 1) represented by the following formula (21) was synthesized by the following method.

[Chemical Formula 29]

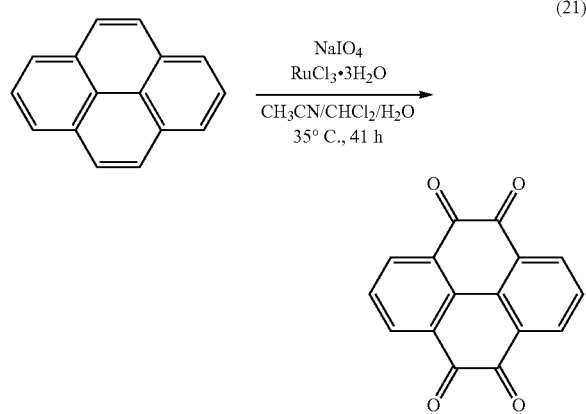

(21)

Pyrene (402 mg, 2.0 mmol), ruthenium chloride (III) trihydrate (48 mg, 0.23 mmol), and sodium periodate (3.51 g, 16.4 mmol) were put in a round bottom flask (50 ml), and methylene chloride (8 ml), acetonitrile (8 ml) and water (10 ml) were added thereto. The reaction liquid was stirred in an argon atmosphere at 35° C. for 16 hours. Thereafter, additional ruthenium chloride (III) trihydrate (19 mg, 0.09 mmol) and sodium periodate (860 mg, 4.0 mmol) were mixed with the reaction liquid and the resultant reaction liquid was stirred in an argon atmosphere at 35° C. for another 25 hours. The reaction liquid was returned to room temperature, and then the reaction liquid was poured into water (100 ml). An organic substance was extracted therefrom by using methylene chloride (20 ml, 3 times). The extracted organic substance was washed with water (20 ml, 2 times), and then a rough product (193 mg) obtained by removing the solvent by an evaporator was subject to silica gel chromatography to isolate pyrene-4,5,9,10-tetraone (177 mg, yield 33%) as a yellow solid. A $^1$H NMR analysis, a $^{13}$C NMR analysis, and a mass analysis were conducted thereon to find the following results were obtained.

$^1$H NMR (400 MHz, CDCl$_3$)•7.73 (t, J=8.0 Hz, 2H), 8.52 (d, J=8.0 Hz, 4 M.

$^{13}$C NMR (100 MHz)•130.9, 131.1, 136.9, 177.7.

HRMS (EI) m/z calcd for C$_{16}$H$_6$O$_4$: 262.0266. found 262.0263.

Synthesis Example 2

2,7-diiodopyrene-4,5,9,10-tetraone (hereinafter referred to as compound 2) represented by the following formula (22) was synthesized by the following method.

[Chemical Formula 30]

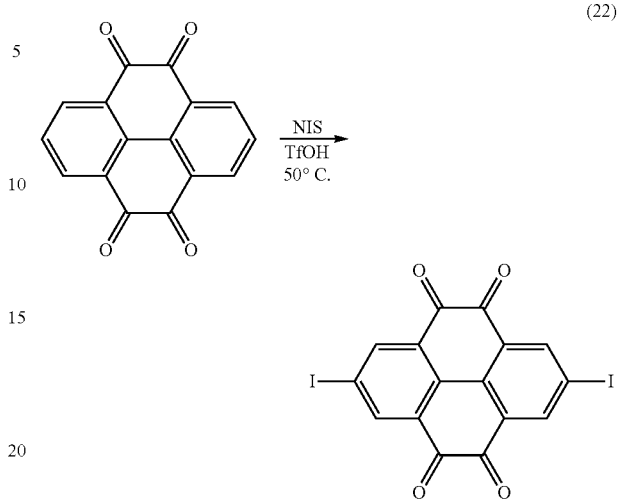

(22)

Pyrene-4,5,9,10-tetraone (503 mg, 1.9 mmol) and N-iodosuccinimide (1.75 g, 7.8 mmol) were added to trifluoromethanesulfonate (2 ml) at 0° C., and then the temperature of the reaction liquid was raised to 60° C. and the reaction liquid was stirred for 26 hours. The reaction liquid was filtered, and the obtained brown solid was washed with water and ethyl acetate and dried under reduced pressure. Thereby, 2,7-diiodopyrene-4,5,9,10-tetraone (856 mg, 1.7 mmol) was obtained in 87% yield. A $^1$H NMR analysis, an infrared absorption spectroscopy analysis, and a mass analysis were conducted thereon to find the following results.

$^1$H NMR (400 MHz, CDCl$_3$) δ 8.79 (s, 4H)

IR (solid): (cm$^{-1}$) 3070, 1708, 1684, 1540, 1418, 1272, 1252, 1084, 903, 704

[M]$^+$: 513.8199. found 513.8199

Synthesis Example 3

2,7-bis(2-fluorophenyl)pyrene-4,5,9,10-tetraone (hereinafter referred to as compound 3) represented by the following formula (23) was synthesized by the following method.

[Chemical Formula 31]

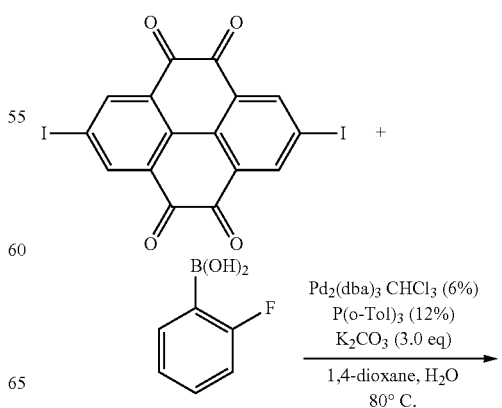

(23)

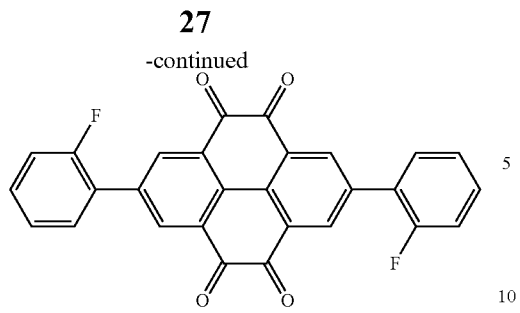

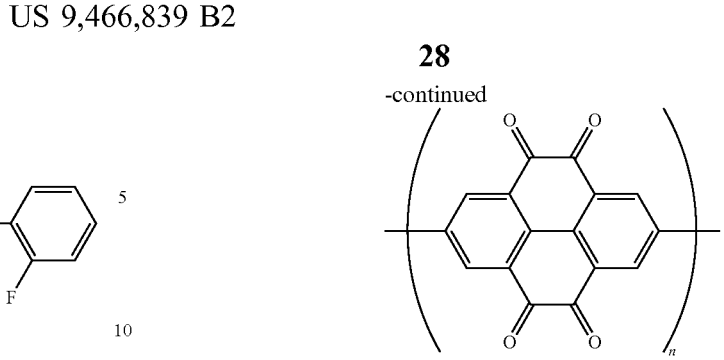

Pd$_2$(dba)$_3$ (46 mg, 0.05 mmol), tris(orthotolyl)phosphine (29 mg, 0.10 mmol), 2-fluorobenzene boronic acid (327 mg, 2.3 mmol), 2,7-diiodopyrene-4,5,9,10-tetraone (403 mg, 0.78 mmol), and potassium carbonate (330 mg, 2.4 mmol) were put in a dry Schlenk flask, and dioxane (3 ml) and water (0.5 ml) were added thereto. The reaction liquid was stirred in an argon atmosphere at 80° C. for 17 hours. The reaction liquid was filtered, and then the obtained solid content was washed with water and a mixed solvent of hexane/ethyl acetate (10:1). Thus, a 699 mg rough product was obtained. A portion of 311 mg was taken from this rough product, and it was heated and stirred in a mixed solvent of methanol (5 ml) and water (5 ml) at 60° C. to be washed. It was washed further with 1 M hydrochloric acid, water, and methanol. Finally, the product was washed with chloroform. Thereby, 2,7-bis(2-fluorophenyl)pyrene-4,5,9,10-tetraone (68 mg) was obtained in 43% yield. An infrared absorption spectroscopy analysis was conducted thereon to find the following results.

IR (solid): (cm$^{-1}$) 1685, 1455, 1258, 922, 822, 751, 716

Synthesis Example 4

Poly(pyrene-4,5,9,10-tetraone-2,7-diyl) (hereinafter referred to as compound 4) represented by the following formula (24) was synthesized by the following method. It should be noted that a larger amount of N-iodosuccinimide was used in Synthesis Example 2 than in Synthesis Example 4. Thus, a diiodo product was synthesized selectively in Synthesis Example 2. In Synthesis Example 4, the amount of N-iodosuccinimide was reduced so that the polymerization proceeds passing via the generation of a highly reactive monoiodine product as an intermediate.

[Chemical Formula 32]

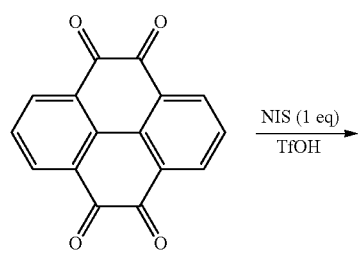

(24)

Pyrene-4,5,9,10-tetraone (334 mg, 1.27 mmol) and N-iodosuccinimide (294 mg, 1.31 mmol) were added to trifluoromethanesulfonate (1.3 ml) at 0° C., and then the temperature of the reaction liquid was raised to 60° C. and the reaction liquid was stirred for 22 hours. After the reaction completed, the reaction liquid was added to water (100 ml) and filtered. The obtained brown solid was washed with water (50 ml), hexane (50 ml) and chloroform (100 ml), and dried under reduced pressure. The resultant powder was dispersed in a proper amount of N-methylpyrrolidone (NMP) and stirred overnight. Thereafter, it was re-precipitated by using ethanol as a poor solvent. As a result, poly(pyrene-4,5,9,10-tetraone-2,7-diyl) (371 mg, 1.4 mmol) was obtained in 112% yield. An infrared absorption spectroscopy analysis and a mass analysis were conducted thereon to find the following results. "Mn" indicates a number-average molecular weight, and "Mw" indicates a weight average molecular weight. One reason for the yield exceeding 100% is that the yield was calculated under the condition that the structure with terminals thereof being ignored was regarded as a unit structure. In the case where an element with a large molecular weight is bonded to the terminals, the yield can exceed 100%.

IR (solid): (cm$^{-1}$) 1671, 1615, 1273, 1098, 1027, 807, 712

Mn: 8890, Mw: 13073 (molecular weights in terms of polystyrene)

Synthesis Example 5

Poly[(pyrene-4,5,9,10-tetraone-2,7-diyl)-co-1,3-phenylene] (hereinafter referred to as compound 5) represented by the following formula (25) was synthesized by the following method.

[Chemical Formula 33]

(25)

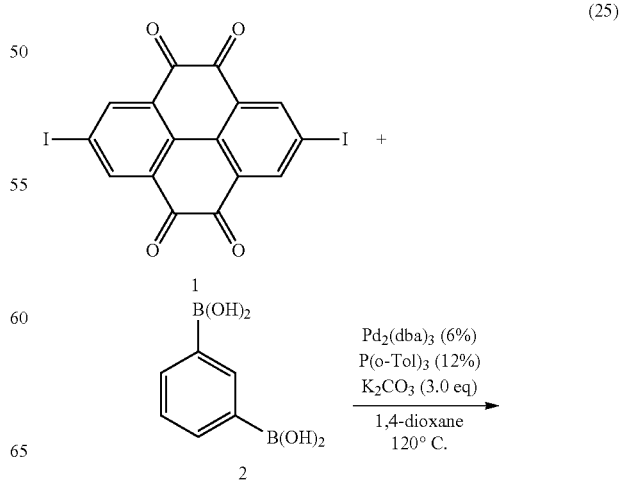

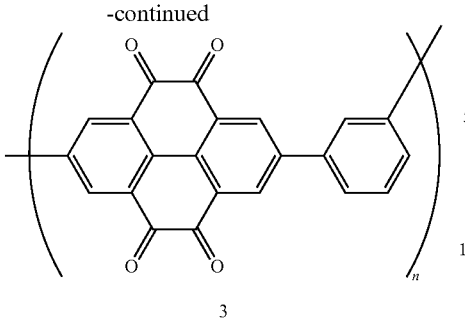

(3)

2,7-diiodopyrene-4,5,9,10-tetraone (317 mg, 0.62 mmol), benzene-1,3-diboronic acid (100 mg, 0.61 mmol), $Pd_2(dba)_3$ (36 mg, 0.039 mmol), tris(orthotolyl)phosphine (22 mg, 0.073 mmol), and potassium carbonate (259 mg, 1.9 mmol) were dissolved in a mixed solvent of dioxane (2.5 ml) and water (0.25 ml) to obtain a reaction liquid. The reaction liquid was sealed in a tube in an argon atmosphere, and stirred at 120° C. for 15 hours in an oil bath. After the reaction completed, the reaction liquid was returned to room temperature, and then the reaction liquid was filtered through a Kiriyama funnel. The obtained solid content was washed with water (50 ml) and ethyl acetate (50 ml) on the Kiriyama funnel, and dried under reduced pressure to obtain a dry solid (272 mg). The dry solid was dissolved in a mixed solvent of methanol (5 ml) and 1 N hydrochloric acid (5 ml), and the solution was stirred in the oil bath at 60° C. for 1.5 hours. After the reaction completed, the solution was filtered through the Kiriyama funnel. The obtained product was washed with water (50 ml), 1 N hydrochloric acid (50 ml), methanol (50 ml) and chloroform (100 ml) on the Kiriyama funnel, and then dried under reduced pressure. The resultant powder was dispersed in a proper amount of N-methylpyrrolidone and stirred overnight. Thereafter, it was re-precipitated by using ethanol as a poor solvent. As a result, poly[(pyrene-4,5,9,10-tetraone-2,7-diyl)-co-1,3-phenylene] (212 mg, yield 109%) was obtained. An infrared spectroscopic analysis and a mass analysis were conducted thereon to find the following results.

IR (solid): ($cm^{-1}$) 1683, 1646, 1544, 1436, 1328, 1270, 1243, 832, 764, 716, 702

Mn: 78119, Mw: 105777 (molecular weights in terms of polystyrene)

Synthesis Example 5 had a significantly larger average molecular weight than those of the other synthesis examples. Although the reason for this is not so clear, the present inventors think that the difference in the linker structure may change the polymerization mechanism. That is, it is presumed that bonding a pyrene ring to the meta position of the phenyl group serving as the linker increased the molecular weight significantly.

Usually, when a product has a high solubility in a reaction solvent, its molecular weight is increased. Presumably, the above-mentioned results were obtained because the polymer had high solubility in dioxane used in Synthesis Example 5. Even the polymer has high solubility in dioxane, it does not necessarily have increased solubility in the electrolytic solution of the battery. Thus, the increase in the molecular weight is a favorable tendency.

Synthesis Example 6

Poly[(pyrene-4,5,9,10-traone-2,7-diyl)-co-1,4-phenylene] (hereinafter referred to as compound 6) represented by the following formula (26) was synthesized by the following method.

[Chemical Formula 34]

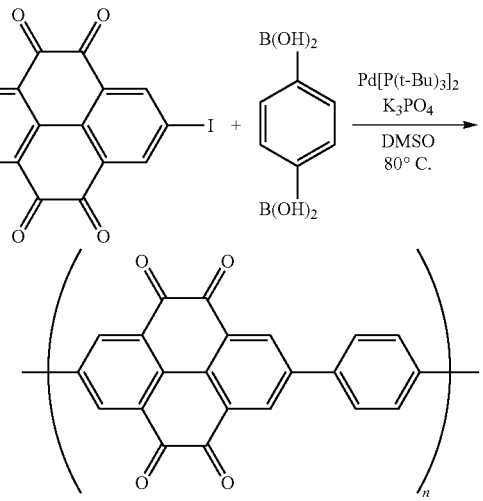

(26)

2,7-diiodopyrene-4,5,9,10-tetraone (129.6 mg, 0.252 mmol), 1,4-benzenediboronic acid (42.3 mg, 0.255 mmol), Pd $[P(t-Bu)_3]_2$ (8.4 mg, 0.0164 mmol), and $K_3PO_4$ (160 mg, 0.754 mmol) were dissolved in DMSO (10 mL), and the reaction liquid was heated and stirred in an argon atmosphere at 80° C. for 14 hours. After the reaction completed, the solid precipitated by diluting the reaction liquid with water (400 mL) was filtered out. The resultant powder was dispersed in a proper amount of N-methylpyrrolidone and stirred overnight. Thereafter, it was re-precipitated by using ethanol as a poor solvent. As a result, poly[(4,5,9,10-pyrenequinone-2,7-diyl)-co-1,4-phenylene] (100.1 mg, yield 118%) was obtained as a black solid. An infrared spectroscopic analysis and a mass analysis were conducted thereon to find the following results.

IR (solid): ($cm^{-1}$) 1678, 1431, 1327, 1215, 1015, 841.

Mn: 7412, Mw: 8849 (molecular weights in terms of polystyrene)

Synthesis Example 7

Poly(pyrene-4,5,9,10-tetraone)-comb-poly(phenylene) (hereinafter referred to as compound 7) represented by the following formula (27) was synthesized by the following method.

[Chemical Formula 35]

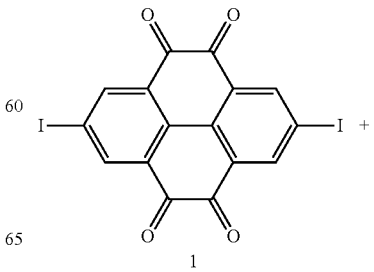

(27)

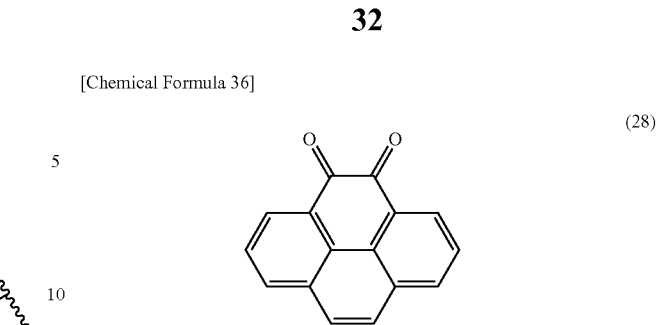

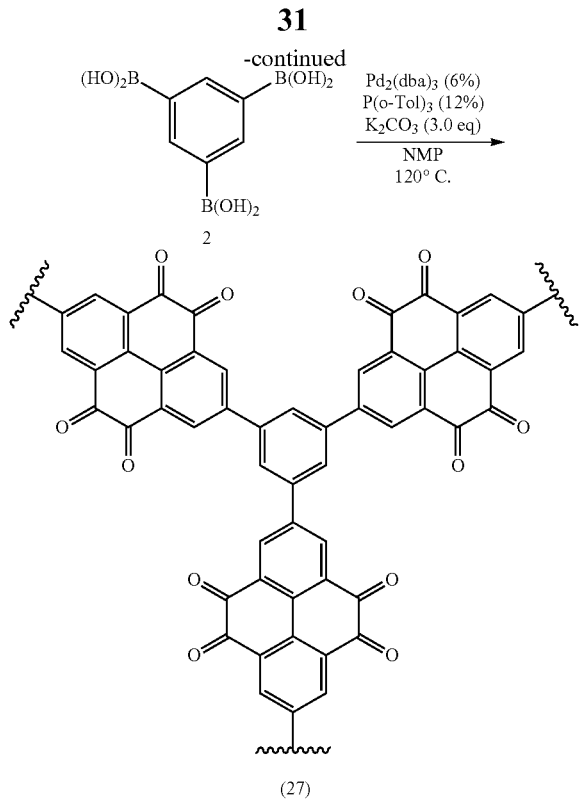

2,7-diiodopyrene-4,5,9,10-tetraone (309 mg, 0.6 mmol), benzene-1,3,5,-triboronic acid (86 mg, 4.1 mmol), $Pd_2(dba)_3$ (24 mg, 0.026 mmol), tris(orthotolyl)phosphine (17 mg, 0.056 mmol), and potassium carbonate (167 mg, 1.2 mmol) were dissolved in a mixed solvent of N-methylpyrrolidone (5.4 ml) and water (0.54 ml) to obtain a reaction liquid. The reaction liquid was sealed in a tube in an argon atmosphere, and heated at 120° C. in an oil bath and stirred for 21 hours. After the reaction completed, the reaction liquid was returned to room temperature, and then the reaction liquid was filtered through a Kiriyama funnel. The obtained solid content was washed with N-methylpyrrolidone (200 ml) and methanol (50 ml) on the Kiriyama funnel, and dried under reduced pressure to obtain a dry solid (383 mg). A part of the dry solid (303 mg) was taken and dissolved in a mixed solvent of methanol (5 ml) and 1 N hydrochloric acid (5 ml). The solution was stirred at 60° C. in the oil bath. After the reaction completed, the solution was filtered through the Kiriyama funnel. The obtained product was washed with water (50 ml), 1 N hydrochloric acid (50 ml), methanol (50 ml) and chloroform (100 ml) on the Kiriyama funnel, and dried under reduced pressure. The resultant powder was dispersed in a proper amount of N-methylpyrrolidone and stirred overnight. Thereafter, it was re-precipitated by using ethanol as a poor solvent. As a result, poly(pyrene-4,5,9,10-tetraone)-comb-poly(phenylene) (138 mg, yield 39%) was obtained. An infrared spectroscopic analysis was conducted to find the following results. The synthesis of benzene-1,3,5,-triboronic acid was performed in accordance with a method described in a known document (The Journal of Organic Chemistry 2006, 691, 150, Chemistry of Materials, 2006, 18, 5296).

IR (solid): (cm$^{-1}$) 1683, 1430, 1256, 716

Synthesis Example 8

Pyrene-4,5-dione (hereinafter referred to as compound 8) represented by the following formula (28) was synthesized by the following method.

[Chemical Formula 36]

(28)

[pyrene-4,5-dione structure]

Pyrene (402 mg, 2.0 mmol), ruthenium chloride (III) trihydrate (41 mg, 0.19 mmol), and sodium periodate (2.0 g, 9.4 mmol) were put in a round bottom flask (50 ml), and methylene chloride (8 ml), acetonitrile (8 ml) and water (10 ml) were added thereto. The reaction liquid was stirred in an argon atmosphere at 35° C. for 21 hours. The reaction liquid was returned to room temperature, and then the reaction liquid was poured into water (100 ml). An organic substance was extracted therefrom by using methylene chloride (20 ml, 3 times). The extracted organic substance was washed with water (20 ml, 2 times), and then a rough product obtained by removing the solvent by an evaporator was subject to silica gel chromatography to isolate pyrene-4,5-dione (105 mg, yield 23%) as an orange solid. An $^1$H NMR analysis was conducted to find the following results. As a reference, "J. Hu, D. Zhang, F. W. Harris, J. Org. Chem. 2005, 70, 707-708." can be mentioned.

$^1$H NMR (400 MHz, CDCl$_3$), δ 8.52 (dd, J=1.2, 7.2 Hz, 2H), 8.20 (dd, J=1.3, 8 Hz, 2H), 7.78 (s, 2H), 7.78 (t, J=7.6 Hz)

Synthesis Example 9

1,8-dibromo-pyrene-4,5,9,10-tetraone (hereinafter referred to as compound 9) represented by the following formula (29) was synthesized by the following method.

[Chemical Formula 37]

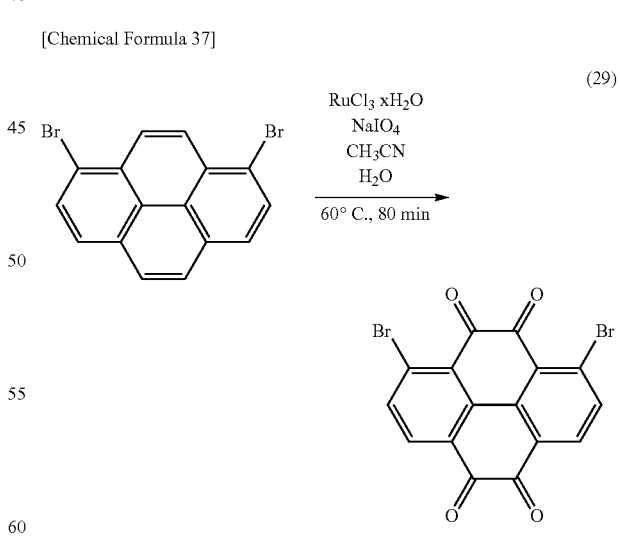

1,8-dibromopyrene (392 mg, 0.98 mmol), sodium periodate (2.142 g, 10 mmol), and ruthenium chloride hydrate (22 mg, 0.11 mmol) were added to a mixed solvent of acetonitrile (20 mL) and water (4 mL), and the reaction liquid was stirred at 60° C. for 80 minutes. The reaction liquid was returned to room temperature, and then the reaction liquid was poured into water (100 ml). An organic substance was extracted therefrom by using methylene chloride (20 ml, 3 times). The extracted organic substance was washed with brine, and then sodium sulfate was added to the obtained extract. Thereafter, sodium sulfate was removed from the extract by filtration, the extract was sent through a short column, and the solvent was removed under reduced pressure. Thereby, 1,8-dibromo-pyrene-4,5,9,10-tetraone (170 mg, yield 41%) was obtained as a yellow solid. A $^1$H NMR analysis, a mass analysis, and an infrared spectroscopic analysis were conducted thereon to find the following results.

$^1$H NMR (400 MHz, CDCl$_3$)•7.99 (d, J=8.4 Hz, 2H), 8.28 (d, J=8.4 Hz, 2H).

HRMS (EI) m/z calcd for C$_{14}$H$_4$Br$_2$O$_4$: 417.8476. found 417.8472.

IR (solid): (cm$^{-1}$) 1678, 1550, 1404, 1315, 1253, 1072, 910, 829.

Synthesis Example 10

2-nitro-4,5,9,10-pyrenetetraone (hereinafter referred to as compound 10) represented by the following formula (30) was synthesized by the following method.

[Chemical Formula 38]

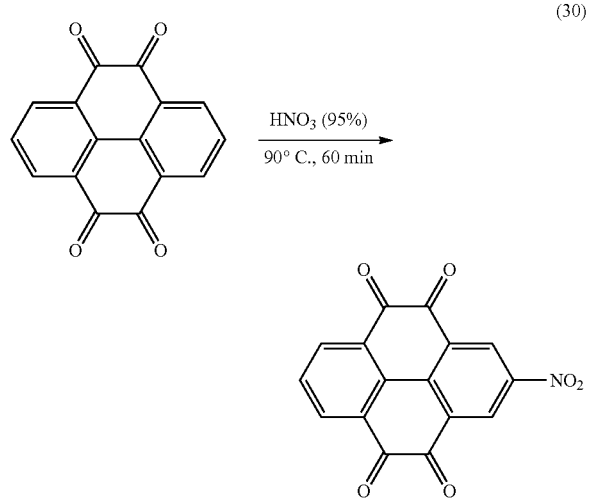

(30)

Pyrene-4,5,9,10-tetraone (240 mg, 0.92 mmol) were added to fuming nitric acid (10 mL) and stirred at 90° C. for 60 minutes. After the reaction completed, the reaction liquid was poured into water (100 mL). The solid obtained by filtration was washed further with water, and then dried under reduced pressure. Thereby, 2-nitro-pyrene-4,5,9,10-tetraone (223 mg, yield 79%) was obtained as a yellow solid. A $^1$H NMR analysis and an infrared spectroscopic analysis were conducted thereon to find the following results.

$^1$H NMR (400 MHz, DMSO-d$_6$)•7.86 (t, J=8.0 Hz, 1H), 8.41 (d, J=8.0 Hz, 2H), 8.81 (s, 2H).

IR (solid): (cm$^{-1}$) 1674, 1574, 1423, 1342, 1273.

Synthesis Example 11

2-amino-pyrene-4,5,9,10-tetraone (hereinafter referred to as compound 11) represented by the following formula (31) was synthesized by the following method.

[Chemical Formula 39]

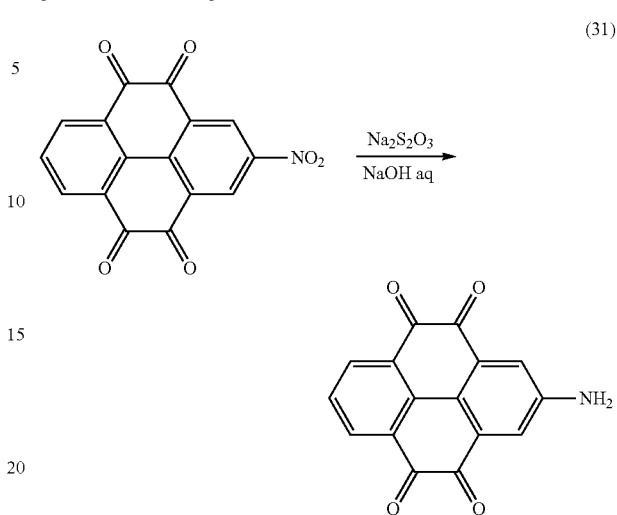

(31)

2-nitro-pyrene-4,5,9,10-tetraone (223 mg, 0.73 mmol) and hydrosulfite (870 mg, 5.0 mmol) were added to a 1.5 M aqueous sodium hydroxide solution (10 mL), and stirred at 60° C. for 15 minutes. After the reaction completed, the reaction liquid was poured into water (500 mL). The solid obtained by filtration was washed further with water, and then dried under reduced pressure. Thus, 2-amino-pyrene-4,5,9,10-tetraone (112 mg, yield 56%) was obtained as a black solid. A $^1$H NMR analysis, a mass analysis, and an infrared spectroscopic analysis were conducted thereon to find the following results.

$^1$H NMR (400 MHz, DMSO-d$_6$)•6.31 (s, 2H), 7.47 (s, 2H), 7.48 (t, J=7.6 Hz, 1H), 8.16 (d, J=8.0 Hz, 2H).

HRMS (EI) m/z calcd for C$_{16}$H$_7$NO$_4$: 277.0375. found 277.0378.

IR (solid): (cm$^{-1}$) 1674, 1431, 1281.

Synthesis Example 12

Pyrene-4,5,9,10-tetraone-1-carboxylic methylester (hereinafter referred to as compound 12) represented by the following formula (32) was synthesized by the following method.

[Chemical Formula 40]

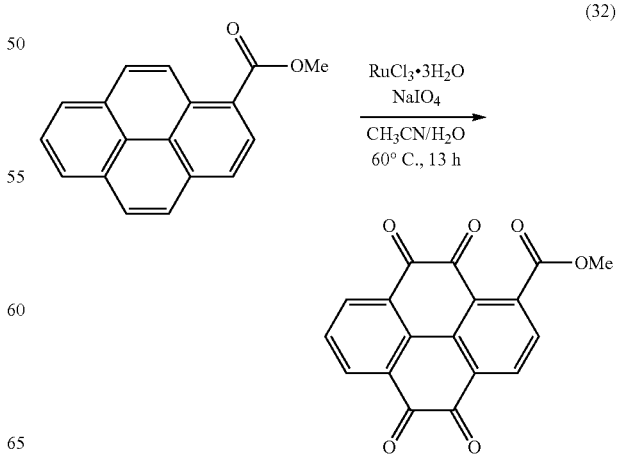

(32)

1-pyrenecarboxylic methylester (130 mg, 0.50 mmol), sodium periodate (858 mg, 4.00 mmol), and ruthenium chloride (III) trihydrate (19.8 mg, 0.10 mmol) were dissolved in a mixed solvent of acetonitrile (10 mL) and water (2 mL) and stirred in air at 60° C. for 13 hours. After the reaction completed, the reaction mixture was sent through a silica gel short column by using ethyl acetate while the reaction mixture was still hot. The solvent was distilled off (removed by distillation), and then the reaction mixture was refined by silica gel chromatography using a mixed solvent containing ethyl acetate and methylene chloride at a ratio of 1:10. As a result, pyrene-4,5,9,10-tetraone-1-carboxylic methylester (64.7 mg, yield 40%) was obtained as a yellow solid. A $^1$H NMR analysis and a mass analysis were conducted thereon to find the following results.

$^1$H NMR (400 MHz, CDCl$_3$) δ 4.03 (s, 3H), 7.65 (d, J=8.0 Hz, 1H), 7.77 (t, J=8.0 Hz, 1H), 8.52-8.56 (m, 3H).

HRMS (EI) m/z calcd for C$_{18}$H$_8$O$_6$ 320.321. found 320.312.

Synthesis Example 13

Pyrene-4,5,9,10-tetraone-1-carboxylic acid (hereinafter referred to as compound 13) represented by the following formula (33) was synthesized by the following method.

[Chemical Formula 41]

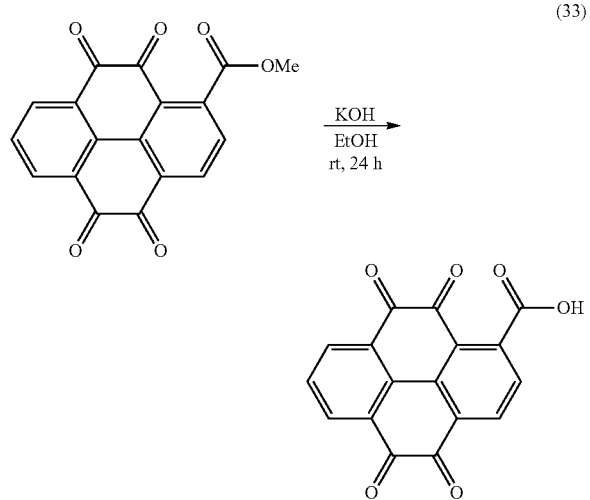

Pyrene-4,5,9,10-tetraone-1-carboxylic methylester (962 mg, 3.00 mmol) and potassium hydroxide (1.5 g, 26.8 mmol) were dissolved in ethanol (30 mL) and stirred in an argon atmosphere at room temperature for 24 hours. After the reaction completed, the reaction mixture was poured into 1 N hydrochloric acid. Through filtration, pyrene-4,5,9,10-tetraone-1-carboxylic acid (641 mg, yield 70%) was obtained as a purple solid. A mass analysis was conducted thereon to find the following results.

HRMS (ESI) m/z calcd for C$_{17}$H$_5$O$_6$ [M-H$^+$] 305.0081. found 305.0096.

Synthesis Example 14

N-hexyl-pyrene-4,5,9,10-tetraone-1-carboxamide (hereinafter referred to as compound 14) represented by the following formula (34) was synthesized by the following method.

[Chemical Formula 42]

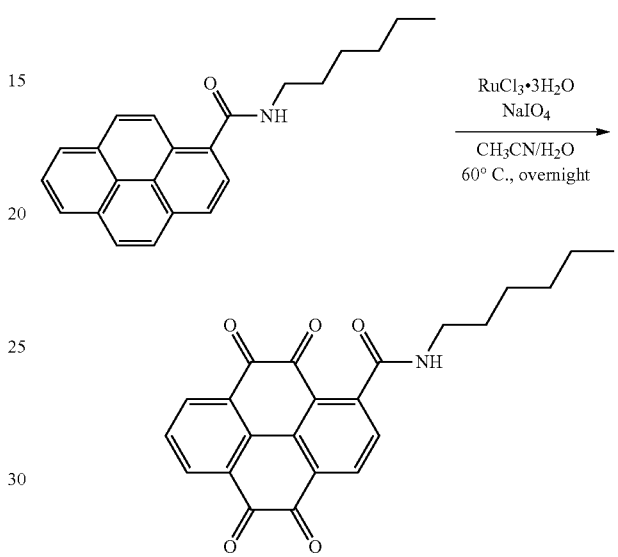

N-hexyl-pyrene-1-carboxamide (169 mg, 0.50 mmol), sodium periodate (866 mg, 4.00 mmol), and ruthenium chloride (III) trihydrate (21.0 mg, 0.10 mmol) were dissolved in a mixed solvent of acetonitrile (10 mL) and water (2 mL) and stirred overnight in air at 60° C. After the reaction completed, the reaction mixture was sent through a silica gel short column by using ethyl acetate while the reaction mixture was still hot. The solvent was distilled off, and then the reaction mixture was refined by silica gel chromatography using a mixed solvent containing ethyl acetate and methylene chloride at a ratio of 1:10. As a result, N-hexyl-pyrene-4,5,9,10-tetraone-1-carboxamide (62.7 mg, yield 33%) was obtained as a brown solid. A $^1$H NMR analysis and a mass analysis were conducted thereon to find the following results.

$^1$H NMR (400 MHz, CDCl$_3$) δ 0.86-1.72 (m, 11H), 3.53 (q, J=6.0 Hz, 1H), 7.59 (d, J=6.8 Hz, 1H), 7.74 (t, J=6.8 Hz, 1H), 8.47-8.53 (m, 3H).

HRMS (EI) m/z calcd for C$_{23}$H$_{19}$O$_5$N 389.1263. found 389.1262.

Synthesis Example 15

Poly[N-(pyrene-4,5,9,10-tetraone-2-yl)methacrylamide-co-methyl methacrylate] (hereinafter referred to as compound 15) represented by the following formula (35) was synthesized by the following method. The introduction ratio of pyrenetetraone was 18% in terms of NMR.

[Chemical Formula 43]

(35)

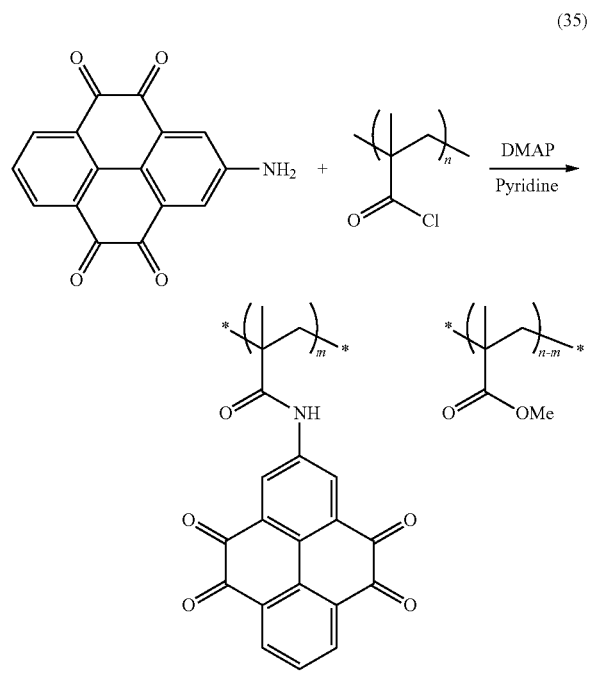

[Chemical Formula 44]

(36)

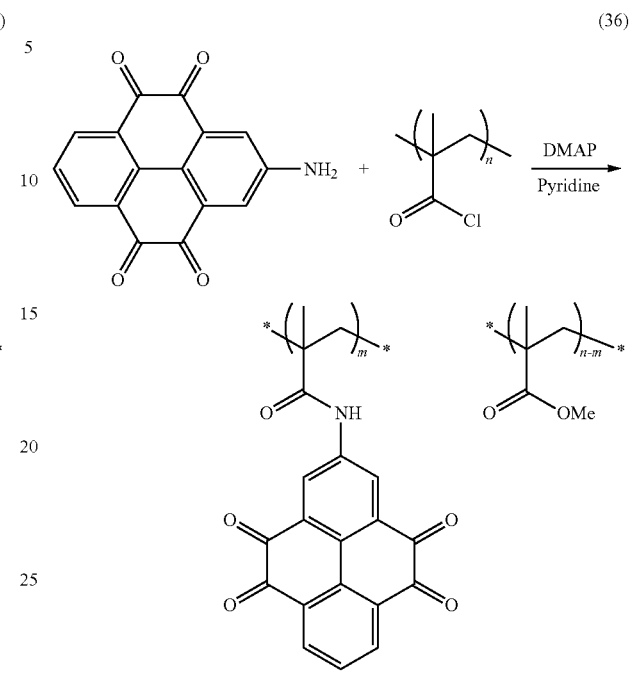

2-amino-pyrene-4,5,9,10-tetraone (97 mg, 0.35 mmol), polymethacryloyl chloride (195 mg), and 4,4'-dimethylamino pyridine (12 mg, 0.1 mmol) were added to dry pyridine (3 mL) and stirred at 50° C. for 8 hours. Then, dry methanol (0.5 mL) was added thereto and stirred at 50° C. for another 12 hours. Thereafter, the reaction liquid was cooled to room temperature and poured into methanol (200 mL). The obtained solid was filtered out and washed with methanol, and then dried under reduced pressure. The obtained powder was dispersed in a proper amount of N-methylpyrrolidone and stirred overnight. Thereafter, it was re-precipitated by using ethanol as a poor solvent. As a result, poly[N-(pyrene-4,5,9,10-tetraone-2-yl)methacrylamide-co-methyl methacrylate] (212 mg, yield 80%) was obtained as an orange solid. A $^1$H NMR analysis, an infrared spectroscopic analysis, and an elemental analysis were conducted thereon to find the following results.

$^1$H NMR (400 MHz, DMSO-$d_6$)•0.6-2.4 (br), 3.54 (bs, OMe), 7.6-8.4 (br, aromatic).

IR (solid): ($cm^{-1}$) 1721, 1686, 1431, 1273, 1188, 1150.

Elemental analysis: C, 63.12; H, 5.40; N, 2.58

Synthesis Example 16

Poly[N-(pyrene-4,5,9,10-tetraone-2-yl)methacrylamide-co-methyl methacrylate] (hereinafter referred to as compound 16) represented by the following formula (36) was synthesized by the following method. The introduction ratio of pyrenetetraone was 50% in terms of NMR.

2-amino-pyrene-4,5,9,10-tetraone (150 mg, 0.5 mmol), polymethacryloyl chloride (100 mg), and 4,4'-dimethylamino pyridine (6 mg, 0.05 mmol) were added to dry pyridine (5 mL) and stirred at 60° C. for 12 hours. Then, dry methanol (0.5 mL) was added thereto and stirred at 50° C. for another 10 hours. Thereafter, the reaction liquid was cooled to room temperature and poured into methanol (200 mL). The obtained solid was filtered out and washed with methanol, and then dried under reduced pressure. The obtained powder was dispersed in a proper amount of N-methylpyrrolidone and stirred overnight. Thereafter, it was re-precipitated by using ethanol as a poor solvent. As a result, poly[N-(pyrene-4,5,9,10-tetraone-2-yl)methacrylamide-co-methyl methacrylate] (150 mg, yield 70%) was obtained as an orange solid. A $^1$H NMR analysis, an infrared spectroscopic analysis, and an elemental analysis were conducted thereon to find the following results.

$^1$H NMR (400 MHz, DMSO-$d_6$)•0.6-3.0 (br), 3.56 (bs, OMe), 7.3-8.7 (br, aromatic).

IR (solid): ($cm^{-1}$) 1682, 1431, 1273, 1188.

Elemental analysis: C, 65.93; H, 3.83; N, 3.40

Synthesis Example 17

Poly[N-(pyrene-4,5,9,10-tetraone-2-yl)methacrylamide-co-methyl methacrylate] (hereinafter referred to as compound 17) represented by the following formula (37) was synthesized by the following method. The introduction ratio of pyrenetetraone was 80% in terms of charge ratio.

[Chemical Formula 45]

(37)

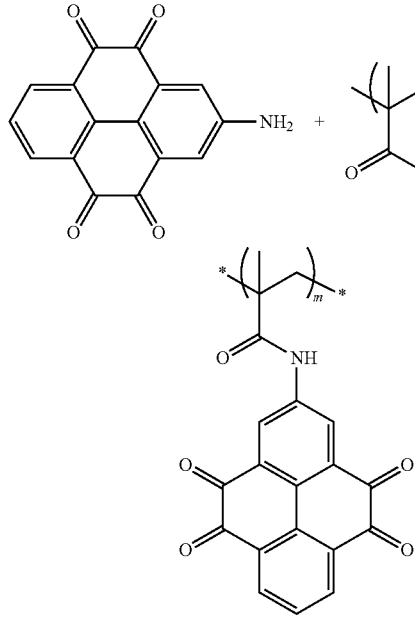

2-amino-pyrene-4,5,9,10-tetraone (110 mg, 0.40 mmol), polymethacryloyl chloride (50 mg), and 4,4'-dimethylamino pyridine (6 mg, 0.05 mmol) were added to dry pyridine (4.0 mL) and stirred at 60° C. for 17 hours. Then, the temperature of the reaction liquid was raised to 70° C. and the reaction liquid was stirred for 19 hours. The temperature was further raised to 100° C. and the reaction liquid was stirred for 56 hours. Thereafter, dry methanol (0.5 mL) was added thereto at 50° C. and the reaction liquid was stirred at 50° C. for another 19 hours. Thereafter, the reaction liquid was cooled to room temperature and poured into methanol (200 mL). The obtained solid was filtered out and washed with methanol. Further, the obtained solid was dissolved in dimethylformamide and poured into methanol (200 mL). The obtained solid was filtered out and dried under reduced pressure. The obtained powder was dispersed in a proper amount of N-methylpyrrolidone and stirred overnight. Thereafter, it was re-precipitated by using ethanol as a poor solvent. As a result, poly[N-(pyrene-4,5,9,10-tetraone-2-yl) methacrylamide-co-methyl methacrylate] (120 mg, yield 81%) was obtained as a purple solid. A $^1$H NMR analysis, an infrared spectroscopic analysis, and an elemental analysis were conducted thereon to find the following results.

$^1$H NMR (600 MHz, DMSO-$d_6$)•0.8-3.6 (br), 3.88 (s), 7.2-8.6 (br, aromatic).

IR (solid): (cm$^{-1}$) 1682, 1431, 1273, 1180.

Elemental analysis: C, 63.84; H, 3.71; N, 4.01

Synthesis Example 18

Poly[N-(pyrene-4,5,9,10-tetraone-2-yl)methacrylamide-co-(2-oxo-1,3-dioxirane-4-yl)methyl methacrylate-co-methyl methacrylate] (hereinafter referred to as compound 18) represented by the following formula (38) was synthesized by the following method. In the formula (38), n−m−l, m, and l are integers indicating the numbers of respective repeating units.

[Chemical Formula 46]

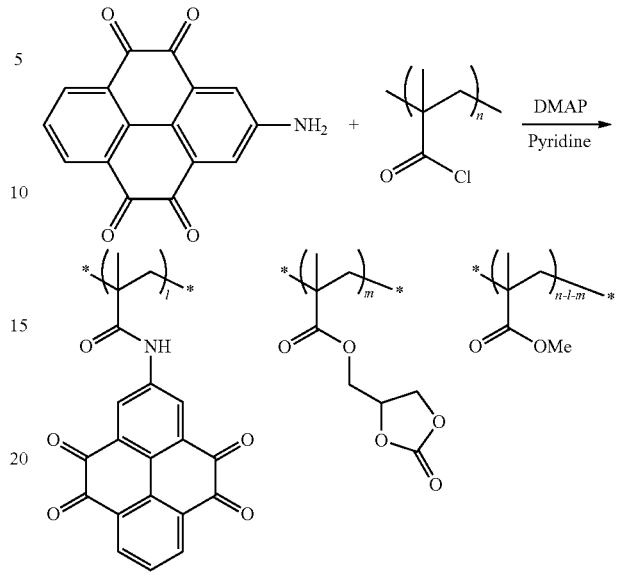

2-amino-pyrene-4,5,9,10-tetraone (70 mg, 0.25 mmol), polymethacryloyl chloride (143 mg), and 4,4'-dimethylamino pyridine (6 mg, 0.05 mmol) were added to dry pyridine (5 mL) and stirred at 60° C. for 6 hours. Then, glycerol 1,2-carbonate (69 mg, 0.6 mmol) was added thereto and stirred at 60° C. for another 12 hours. Dry methanol (0.5 mL) was added to the reaction liquid and stirred at 50° C. for another 12 hours. Thereafter, the reaction liquid was cooled to room temperature and poured into methanol (300 mL). The obtained solid was filtered out and washed with methanol. Further, the obtained solid was dissolved in dimethylformamide and poured into methanol (200 mL). The resultant solid was filtered out and dried under reduced pressure. The obtained powder was dispersed in a proper amount of N-methylpyrrolidone and stirred overnight. Thereafter, it was re-precipitated by using ethanol as a poor solvent. As a result, poly[N-(pyrene-4, 5, 9,10-tetraone-2-yl)methacrylamide-co-(2-oxo-1,3-dioxirane-4-yl) methyl methacrylate-co-methyl methacrylate] (130 mg, yield 52%) was obtained as an orange solid. A $^1$H NMR analysis and an infrared spectroscopic analysis were conducted thereon to find the following results.

$^1$H NMR (400 MHz, DMSO-$d_6$)•0.6-2.4 (br), 3.53 (bs, OMe), 4.0-4.4 (br), 4.61 (bs), 5.06 (bs), 7.6-8.4 (br, aromatic).

IR (solid (cm$^{-1}$) 1798, 1728, 1686, 1431, 1273, 1157.

Test 1

Reference Example 1

The compound 1 was crushed in a mortar. The crushed compound 1 had an average particle diameter of about 10 µm. 12.5 mg of the crushed compound 1 and 100 mg of acetylene black (conducting agent) were mixed uniformly, and further 25 mg of polytetrafluoroethylene (binder) was added thereto and mixed. Thus, a positive electrode material mixture was prepared.

This positive electrode material mixture was applied onto a positive electrode current collector made of aluminum metal mesh. A pressure was exerted on the applied positive electrode material mixture to bring the positive electrode material mixture into close contact with the positive electrode current collector. Thereafter, vacuum drying was performed thereon to form a positive electrode active material layer on the positive electrode current collector. The positive electrode current collector and the positive electrode active material layer were punched out to produce a disc-shaped positive electrode with a diameter of 13.5 mm. The weight of the positive electrode active material applied was 1.4 mg/cm$^2$ per unit area of the positive electrode.

Using the produced positive electrode, a battery having the structure described with reference to FIG. 1 was fabricated. First, the case and the sealing plate described with reference to FIG. 1 were prepared. The positive electrode was disposed in the case so that the positive electrode current collector is in contact with an inner surface of the case, and a separator made of polyethylene porous sheet was placed thereon. Next, a non-aqueous electrolyte was put in the case. The non-aqueous electrolyte used was an electrolytic solution obtained by dissolving, at a concentration of 1 mol/liter, lithium hexafluorophosphate in a mixed solvent containing ethylene carbonate and ethyl methyl carbonate at a weight ratio of 1:3. On the other hand, the negative electrode current collector and the negative electrode active material layer are disposed in this order on an inner surface of the sealing plate. The gasket was attached to the sealing plate. Then, the case was covered with the sealing plate and they were crimped together by a pressing machine. Thereby, a coin-type battery of Reference Example 1 was obtained. The negative electrode active material layer used was a negative electrode active material layer obtained by punching out a 100 μm-thick lithium metal into a disc shape. The lithium metal also functions as a current collector. The battery was produced in an argon-atmosphere glove box equipped with a gas purifier.

Comparative Example 1

A coin-type battery of Comparative Example 1 was fabricated by the same method as that in Reference Example 1, except that 9,10-phenanthrenequinone represented by the following formula (39) (produced by Aldrich) was used as the orthoquinone compound for the positive electrode active material.

[Chemical Formula [47]]

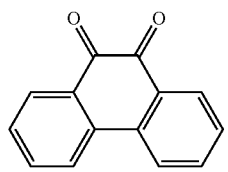

(39)

Comparative Example 2

A coin-type battery of Comparative Example 2 was fabricated by the same method as that in Reference Example 1, except that the compound 8 obtained in Synthesis Example 8 was used.

Figure 2:
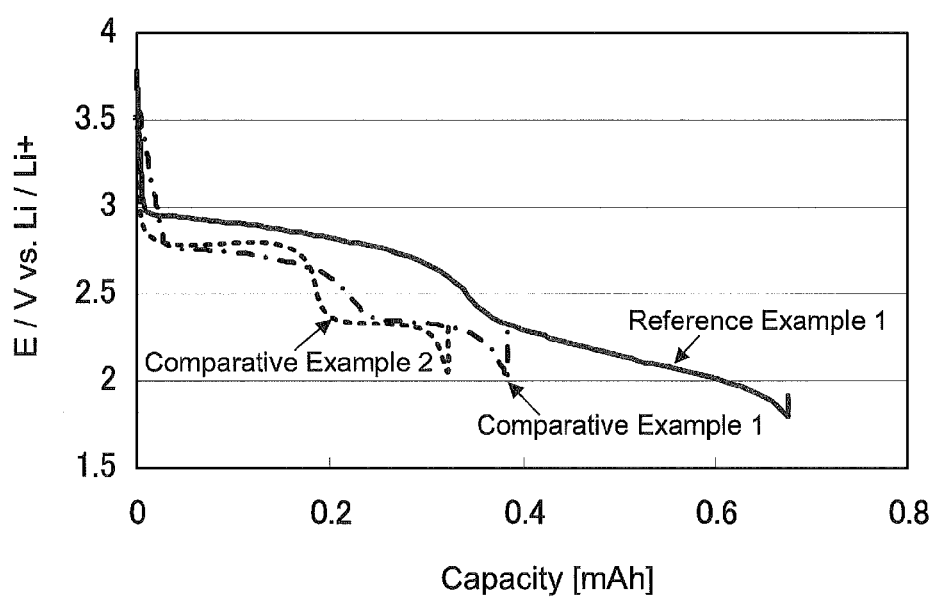
FIG. 2 is a graph showing the results of a charge and discharge test on batteries according to Reference Example 1, Comparative Example 1, and Comparative Example 2.

Subsequently, the batteries of Reference Example 1, Comparative Example 1 and Comparative Example 2 were subject to a charge and discharge test. The charge and discharge test was conducted at a current value equivalent to 0.2 C rate (5-hour rate) with respect to the theoretical capacity of each battery. On Reference Example 1, it was conducted at a voltage in the range of 1.8 to 4.0 V. On Comparative Examples 1 and 2, it was conducted at a voltage in the range of 2.0 to 4.0 V. The charge and discharge test started with discharge first. A 5-minute pause was inserted between discharge and charge and between charge and discharge. FIG. 2 shows discharge behaviors in the third cycle.

As shown in FIG. 2, Reference Example 1, Comparative Example 1 and Comparative Example 2 each exhibited a discharge behavior with two plateaus. A discharge voltage (corresponding to a plateau in FIG. 2) indicating the first step of the reduction reaction (the reaction corresponding to (A2) or (A3)) was observed at around 2.9 V on Reference Example 1, and at around 2.7 V on Comparative Example 1 and Comparative Example 2. Moreover, on each of Reference Example 1, Comparative Example 1 and Comparative Example 2, a discharge voltage indicating the second step of the reduction reaction (the reaction corresponding to (B2) or (B3)) was observed at around 2.3 V or 2.6 V.

The discharge voltages of Comparative Example 1 (9,10-phenanthrenequinone) were almost the same as those of Comparative Example 2 (pyrene-4,5-dione). On the other hand, on Reference Example 1 (pyrene-4,5,9,10-tetraone), the high-voltage-side discharge plateau was higher than those on Comparative Examples 1 and 2 by about 0.2 V. Since the tetraketone compound used in Reference Example 1 had no substituent, the higher discharge voltage is not an effect obtained by the introduction of a substituent, etc. but an effect derived from the tetraketone skeleton. As can be understood from the results of Comparative Examples 1 and 2, the mere replacing of the 9,10-phenanthrenequinone skeleton with a pyrene ring does not increase the discharge voltage of the battery. The pyrene-4,5,9,10-tetraone used in Reference Example 1 had four ketone groups at symmetrical positions on the pyrene ring, and exhibited a different discharge behavior from those of the quinone compounds used in Comparative Examples 1 and 2. These results suggest that in order to increase the discharge voltage of the battery, it is very effective to design a compound in which four ketone groups are introduced in symmetrical positions on a pyrene ring.

Test 2

The solubility of each of the compounds 1 to 7, 11, 12, and 15 to 18 was evaluated by the following method.

Lithium borofluoride was dissolved in propylene carbonate at a concentration of 1.0 mol/L to obtain an electrolytic solution. The compound 1 was mixed with 20 cc of this electrolytic solution at a concentration of 5.0 mmol/L. Thus, a test liquid was prepared. This test liquid was measured for ultraviolet-visible absorption spectrum to see the solubility of the compound 1 in the electrolytic solution. The solubility of each of the compounds 2 to 7 was measured also by the same method. The measurement of ultraviolet-visible absorption spectrum was made in the range of 190 to 900 nm. An electrolytic solution containing no compound was used as a reference solution. UV-2550 (trade name) manufactured by Shimadzu Corp. was used for the measurement. As a comparative example, the solubility of 9,10-phenanthrenequinone in the electrolytic solution was also evaluated.

The test liquid containing 9,10-phenanthrenequinone showed a sharp absorption peak at around 250 to 350 nm. This absorption peak was due to 9,10-phenanthrenequinone.

Test liquid containing the compound 1 (pyrene-4,5,9,10-tetraone) showed some absorption peak at around 50 to 400 nm. That is, only a trace amount of the compound 1 was dissolved therein. In contrast, the test liquids containing the compounds 2 to 7, 11, 12, and 15 to 18, respectively, showed no clear absorption peak in the measurement region. That is, the compounds 2 to 7 each was not dissolved almost at all in the electrolytic solution. A visual observation found that the test liquid containing 9,10-phenanthrenequinone was colored yellow. The electrolytic solution containing the compound 1 was lightly colored brown. In contrast, the test liquids containing the compounds 2 to 7, 11, 12, and 15 to 18, respectively, were not colored, and the compounds were precipitated without being dissolved.

The above-mentioned results suggest that it is possible to lower the solubility of the tetraketone compound in the electrolytic solution by derivatizing or polymerizing the tetraketone compound. The effect of lowering the solubility is particularly excellent when a substituent is introduced in the second and/or seventh position on a pyrene ring. This is because the introduction of a substituent to the second and seventh position can increase effectively the flatness of the molecule, thereby strengthening the intermolecular force. Furthermore, the effect of lowering the solubility can be more expected when the substituent introduced in the second and seventh position is an aromatic substituent such as a phenyl group and thiophene.

Test 3

The properties of the batteries in which the compounds 2 to 7, 11, 12, and 15 to 18 were used, respectively, as the positive electrode active material were investigated by the following method. In addition, the properties of the battery of Comparative Example 1 in which 9,10-phenanthrenequinone represented by the formula (23) was used as the positive electrode active material was investigated.

Examples 2 to 13

A battery of Example 2 was fabricated in the same manner as in Reference Example 1, except that the compound 2 was used. Likewise, batteries of Examples 3 to 7 were fabricated with the compounds 3 to 7, respectively. Batteries of Examples 8 and 9 were fabricated with the compounds 11 and 12, respectively.

In addition, batteries of Examples 10 to 13 were fabricated with the compounds 15 to 18, respectively. The positive electrodes of the batteries of Examples 10 to 13 were fabricated by the following method. The method used was the same as that used in Reference Example 1, except for the method of producing the positive electrodes. The compounds 15 to 18 were soluble in NMP that is an aprotic solvent. Thus, a conducting agent and a binder were added to each of the solutions obtained by dissolving the respective compounds 15 to 18 in NMP, and thus slurries for producing positive electrodes were prepared. The positive electrodes were produced using these slurries.

First, 50 mg of the compound 15 was dissolved in 150 mg of NMP, and 400 mg of acetylene black, 100 mg of polyvinylidene fluoride and additional 5.8 g of NMP were added thereto and kneaded to obtain a slurry for producing a positive electrode. Next, the slurry was applied to a current collector so that a positive electrode active material layer is formed on the current collector. A 20 μm-thick aluminum foil was used as the current collector. The application of the slurry to the aluminum foil was performed using a coater. The application was performed with a gap width of about 300 μm and a drawing rate of 7 mm/sec. Subsequently, the positive electrode active material layer and the current collector were put in a thermostatic bath and dried at a temperature of 80° C. for 1 hour, so that NMP was removed from the positive electrode active material layer. Thereafter, the current collector and the positive electrode active material layer were punched out into a disc shape with a diameter of 13.5 mm to obtain a positive electrode. The battery of Example 10 was fabricated using this positive electrode.

Positive electrodes were produced with the compounds 16 to 18, respectively, by the same method as that used for the compound 15, and the batteries of Examples 11 to 13 were produced using the obtained positive electrodes.

[Evaluation]

The batteries of Examples 2 to 13 and the battery of Comparative Example 1 were subject to a charge and discharge test. The charge and discharge test was conducted at a current value equivalent to 0.2 C rate (5-hour rate) with respect to the theoretical capacity of each battery. The charge and discharge test started with discharge first. A 5-minute pause was inserted between discharge and charge and between charge and discharge. The charge and discharge were repeated 20 times. Table 1 shows the results thereof.

TABLE 1

|  | Positive electrode active material | Theoretical capacity [mAh/g] | Average discharge voltage [V] | Capacity retention rate after 20 cycles [%] |
| --- | --- | --- | --- | --- |
| Example 2 | Compound 2 (Formula 22) | 208 | 2.91, 2.35 | 75 |
| Example 3 | Compound 3 (Formula 23) | 238 | 2.88, 2.35 | 80 |
| Example 4 | Compound 4 (Formula 24) | 412 | 2.90, 2.35 | 93 |
| Example 5 | Compound 5 (Formula 25) | 336 | 3.40, 2.75 | 98 |
| Example 6 | Compound 6 (Formula 26) | 336 | 3.10, 2.62 | 97 |
| Example 7 | Compound 7 (Formula 27) | 376 | 3.10, 2.62 | 98 |
| Example 8 | Compound 11 (Formula 31) | 387 | 2.87, 2.23 | 76 |
| Example 9 | Compound 12 (Formula 32) | 320 | 3.07, 2.87 | 77 |
| Example 10 | Compound 15 (Formula 35) | 192 | 2.90, 2.40 | 97 |
| Example 11 | Compound 16 (Formula 36) | 262 | 2.90, 2.40 | 98 |
| Example 12 | Compound 17 (Formula 37) | 307 | 2.90, 2.40 | 98 |
| Example 13 | Compound 18 (Formula 38) | 132 | 2.90, 2.45 | 98 |
| C. Example 1 | 9,10-phenanthrenequinone | 256 | 2.71, 2.35 | 15 |

Table 1 shows the theoretical capacity (mAh/g) per 1 g of the positive electrode active material, and the capacity retention rate (%). The capacity retention rate (%) indicates the percentage of the 20th discharge capacity with respect to the first-discharge capacity. All of the batteries of Examples 2 to 13 and Comparative Example 1 were found to make a reversible charge and discharge action.

The batteries of Examples 2 to 7 each had a relatively large theoretical capacity in the range of 208 to 412 mAh/g. The batteries of Examples 8 to 13 each had a theoretical capacity in the range of 132 to 387 mAh/g. The battery of Comparative Example 1 exhibited a discharge voltage of 2.71 V (the first step) and a discharge voltage of 2.35 V (the second step). In contrast, the batteries of Examples 2 to 13 each had a discharge voltage of 2.8 V or higher in the first step. Particularly, the batteries of Examples 5 to 7, and 9 each had a very high discharge voltage, which was 3.0 V or higher.

After the charge and discharge cycles, the battery of Comparative Example 1 maintained only 15% of its capacity. In contrast, all the batteries of Examples 2 to 13 maintained 75% or more of their capacities. Particularly, the batteries of Examples 4 to 7 and 10 to 13 maintained 93% or more of their capacities.

When the battery of Comparative Example 1 was disassembled after the charge and discharge cycles, the electrolytic solution was colored green. Presumably, the coloration of the electrolytic solution was caused by the dissolution of the positive electrode active material. Thus, the dissolution of the positive electrode active material in the electrolytic solution that occurs along with the charge and discharge cycles is the cause of the decrease in the capacity retention rate. Conceivably, the batteries of Examples 2 to 13 each was able to achieve a high capacity retention rate because the dissolution of the positive electrode active material in the electrolytic solution was suppressed.

The compound 3 used in Example 3 was a derivative obtained by introducing an aromatic ring, as a substituent, into pyrene-4,5,9,10-tetraone (the compound 1). Example 3 exhibited a higher capacity retention rate than that of Example 2. This suggests that it is very effective to design an electrode active material in which an aromatic group, such as a phenylene group and a divalent residue of thiophene, is introduced in a pyrene ring, in suppressing the dissolution of the positive electrode active material in the electrolytic solution and thereby increasing the utilization ratio.

Examples 4 to 7 each had a much more increased capacity retention rate than those of Examples 2 and 3. That is, a polymer obtained by bonding directly the pyrene rings forming the tetraketone skeletons, and a polymer obtained by bonding a plurality of pyrene rings via an arbitrary linker are very effective in increasing the utilization ratio and the capacity retention rate. As can be understood from a comparison between Example 4 and Examples 5 to 7, the polymerization via an appropriate linker increased further the capacity retention rates and the discharge voltages of the batteries. Also, as can be understood from the results shown in Table 1, the polymerization via an appropriate linker increased further the capacity retention rates and the discharge voltages of the batteries. Furthermore, Examples 10 to 13 indicate that even when the tetraketone skeleton as a reactive portion is located in a side chain, it is possible to obtain effects equivalent to those in the case where the tetraketone skeleton is located in a main chain.

The influence that the linker makes on the discharge potential is not so clear, but the present inventors think as follows as of the filing of the present application. That is, use of a phenyl group as the linker presumably causes a certain act like a substituent effect, and an effect (effect of increasing the reaction potential) favorable for the oxidation-reduction potential of the tetraketone skeleton was achieved. In Examples 5 to 7, the synthesis was performed through the coupling using boron acid. This method has advantages such that it makes it easy to perform the synthesis and control the synthesis. This is because the aromatic compound as the linker has a higher reactivity than that of chain hydrocarbon. Of course, chain hydrocarbon can be used as the linker.

The polymers had a number-average molecular weight of 5000 to 10000, and an average polymerization degree of about 6 to 20, and the effect of lowering the solubility was obtained sufficiently.

In order to lower the solubility of the aromatic tetraketone compound in the electrolytic solution while maintaining its high discharge potential property, it is very effective to design (i) an aromatic tetraketone compound in which a substituent (particularly an aromatic substituent such as a phenyl group) is introduced in each of the second position and the seventh position on a pyrene ring, (ii) a polymer obtained by polymerizing an aromatic tetraketone compound at the second and seventh positions on the pyrene ring, or (iii) a polymer obtained by polymerizing an aromatic tetraketone compound via a linker such as a phenyl group. Particularly, a polymer compound containing pyrene-4,5,9,10-tetraone as a repeating unit has high utility value as the electrode active material. At least one of four hydrogen atoms bound to respective carbons at the first, third, sixth and eighth positions on the pyrene ring of pyrene-4,5,9,10-tetraone may be substituted by an arbitrary substituent, as described for the formula (6). The pyrene ring can be bonded to another adjacent pyrene ring at the second and seventh positions directly or via the above-mentioned arbitrary linker.

Next, the batteries of Examples 4 to 7 and 10 to 13 were subject to a 50-cycle charge and discharge test under the same conditions as those used for the 20-cycle charge and discharge test. Table 2 shows the results thereof.

TABLE 2

| | Positive electrode active material | Theoretical capacity [mAh/g] | Capacity retention rate after 50 cycles [%] |
|---|---|---|---|
| Example 4 | Compound 4 (Formula 24) | 412 | 80 |
| Example 5 | Compound 5 (Formula 25) | 336 | 96 |
| Example 6 | Compound 6 (Formula 26) | 336 | 95 |
| Example 7 | Compound 7 (Formula 27) | 376 | 95 |
| Example 10 | Compound 15 (Formula 35) | 192 | 96 |
| Example 11 | Compound 16 (Formula 36) | 262 | 96 |
| Example 12 | Compound 17 (Formula 37) | 307 | 96 |
| Example 13 | Compound 18 (Formula 38) | 132 | 97 |

The battery of Example 4 exhibited satisfactory cycle characteristics until the twentieth cycle. However, its capacity retention rate lowered to 80% at the fiftieth cycle. After being synthesized, each polymer compound used in Examples 4 to 7 and Examples 10 to 13 was subject to a re-precipitation treatment to remove foreign matters and low-molecular components such as the raw material. Each polymer compound used in Examples 5 to 7 and Examples 10 to 13, in which the linker was introduced, was dissolved in NMP used as a good solvent. However, the polymer compound (poly(pyrene-4,5,9,10-tetraone-2,7-diyl)) used in Example 4 had poor solubility in NMP and the re-precipitation treatment was unsuccessful, causing foreign matters, etc. to be contained therein. Conceivably, this lowered the capacity retention rate as the charging and discharging cycles proceeded. These results indicate that use of a polymer compound with a linker makes it possible to achieve satisfactory long-term cycle characteristics.

Furthermore, Examples 10 to 13 each exhibited a capacity retention rate of 96% or higher even at the fiftieth cycle. In Examples 10 to 13, each positive electrode was produced by the wet method in which a mixture (slurry) obtained by dissolving the corresponding one of the compounds 15 to 18 in an organic solvent (NMP) was used. It can be said that this electrode production method made it possible to achieve the satisfactory cycle characteristics. One reason for this is that since the polymer active material was dissolved in the solvent, the active material was compounded, in a molecular state, with the conducting agent without the molecular chains of the active material being entangled, thereby forming a structure in which the active material lies, in the form of a thin film, on the surface of the conducting agent.

The above-mentioned findings suggest that, it is possible to achieve satisfactory long-term cycle characteristics by using a polymer having a property of not being dissolved in an electrolytic solution but of being dissolved in a specific solvent in order to achieve satisfactory cycle characteristics. A polymer having a tetraketone skeleton in a side chain thereof can have a property of not being dissolved in an electrolytic solution but of being dissolved in a specific solvent in accordance with the solubility of its portion containing no tetraketone skeleton in a solvent. This selective solubility is given to a polymer by selecting appropriately the structure of the portion containing no tetraketone skeleton. Consequently, this makes it possible to design a polymer having satisfactory long-term cycle characteristics.

INDUSTRIAL APPLICABILITY

The electrode active material of the present invention is suitable for electricity storage devices, especially for electricity storage devices in which non-aqueous electrolytes are used. In addition, the electricity storage device of the present invention is used suitably for power supplies for portable electronic apparatuses, power supplies for transport machines, uninterruptible power systems, etc.

The invention claimed is:
1. An electrode for an electricity storage device, the electrode comprising:
an electrode current collector; and
an electrode active material disposed on the electrode current collector, the electrode active material having a structure represented by the following formula (1):

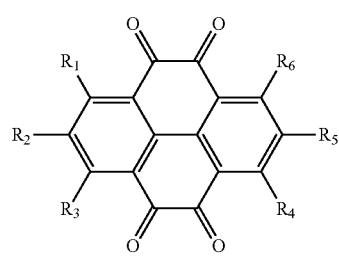

(1)

where $R_1$ to $R_6$ each denote independently a hydrogen atom (except for a case where all of $R_1$ to $R_6$ denote hydrogen atoms), a halogen atom, an optionally substituted phenyl group, an optionally substituted heterocyclic group, or an optionally substituted hydrocarbon group having 1 to 4 carbon atoms, wherein the electrode active material is a polymer compound containing the structure represented by the formula (1) as a repeating unit.

2. The electrode for an electricity storage device according to claim 1, wherein $R_1$, $R_3$, $R_4$ and $R_6$ each denote a hydrogen atom.

3. The electrode for an electricity storage device according to claim 1, wherein the polymer compound further contains a repeating unit including no quinone portion.

4. An electrode active material for an electricity storage device, having a repeating unit represented by the following formula (6):

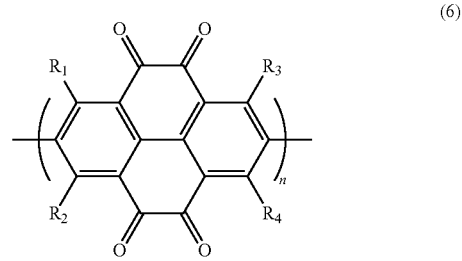

(6)

where $R_1$ to $R_4$ each denote independently a hydrogen atom, a halogen atom, an optionally substituted hydrocarbon group, or an optionally substituted heterocyclic group, and n denotes an integer of 2 or more.

5. An electrode active material for an electricity storage device, having a repeating unit represented by the following formula (10):

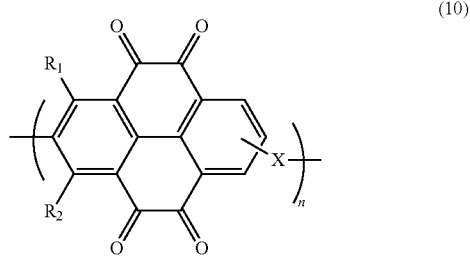

(10)

where $R_1$ and $R_2$ each denote independently a hydrogen atom, a halogen atom, an optionally substituted hydrocarbon group, or an optionally substituted heterocyclic group, X denotes a linker, and n denotes an integer of 2 or more.

6. An electrode active material for an electricity storage device, having two repeating units represented by the following formula (19):

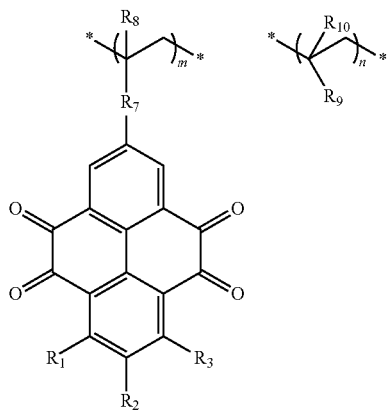

(19)

where $R_1$, $R_2$ and $R_3$ each denote independently a hydrogen atom, a halogen atom, an optionally substituted hydrocarbon group, or an optionally substituted heterocyclic group, $R_7$ denotes an alkylene chain having 1 to 4 carbon atoms, an alkenylene chain having 1 to 4 carbon atoms, an arylene chain, an ester bond, an amide bond, or an ether bond, and is optionally substituted, $R_9$ contains at least one selected from the group consisting of an ester group, an ether group, a carbonyl group, a cyano group, a nitro group, a nitroxyl group, an alkyl group, a phenyl group, an alkylthio group, a sulfone group, and a sulfoxide group, $R_8$ and $R_{10}$ each denote independently a saturated aliphatic group having 1 to 4 carbon atoms, a phenyl group, or a hydrogen atom, and n and m each denote an integer of 2 or more.

7. An electricity storage device comprising a positive electrode, a negative electrode, and an electrolyte,
wherein at least one selected from the positive electrode and the negative electrode is the electrode for an electricity storage device according to claim 1.

8. An electricity storage device comprising:
a positive electrode that is the electrode according to claim 1;
a negative electrode containing a negative electrode active material capable of absorbing and desorbing a lithium ion; and
an electrolyte containing a salt composed of an anion and a lithium cation.

9. The electricity storage device according to claim 8, wherein the electrolyte is a liquid electrolyte further containing an organic solvent.

10. An electrode for an electricity storage device, the electrode comprising,
an electrode current collector; and
the electrode active material according to claim 4 disposed on the electrode current collector.

11. An electricity storage device comprising a positive electrode, a negative electrode, and an electrolyte,
wherein at least one selected from the positive electrode and the negative electrode is the electrode for an electricity storage device according to claim 10.

12. An electricity storage device comprising:
the positive electrode that is the electrode according to claim 10;
a negative electrode containing a negative electrode active material capable of absorbing and desorbing a lithium ion; and
an electrolyte containing a salt composed of an anion and a lithium cation.

13. The electricity storage device according to claim 12, wherein the electrolyte is a liquid electrolyte further containing an organic solvent.

14. An electrode for an electricity storage device, the electrode comprising,
an electrode current collector; and
the electrode active material according to claim 5 disposed on the electrode current collector.

15. An electricity storage device comprising a positive electrode, a negative electrode, and an electrolyte,
wherein at least one selected from the positive electrode and the negative electrode is the electrode for an electricity storage device according to claim 14.

16. An electricity storage device comprising:
the positive electrode that is the electrode according to claim 14;
a negative electrode containing a negative electrode active material capable of absorbing and desorbing a lithium ion; and
an electrolyte containing a salt composed of an anion and a lithium cation.

17. The electricity storage device according to claim 16, wherein the electrolyte is a liquid electrolyte further containing an organic solvent.

18. An electrode for an electricity storage device, the electrode comprising,
an electrode current collector; and
the electrode active material according to claim 6 disposed on the electrode current collector.

19. An electricity storage device comprising a positive electrode, a negative electrode, and an electrolyte,
wherein at least one selected from the positive electrode and the negative electrode is the electrode for an electricity storage device according to claim 18.

20. An electricity storage device comprising:
the positive electrode that is the electrode according to claim 18;
a negative electrode containing a negative electrode active material capable of absorbing and desorbing a lithium ion; and
an electrolyte containing a salt composed of an anion and a lithium cation.

21. The electricity storage device according to claim 20, wherein the electrolyte is a liquid electrolyte further containing an organic solvent.

\* \* \* \* \*